US011958737B2

(12) United States Patent
Nini

(10) Patent No.: US 11,958,737 B2
(45) Date of Patent: Apr. 16, 2024

(54) DISPENSING TAP FOR RIGID AND FLEXIBLE CONTAINERS, PREFERABLY OF THE BAG-IN-BOX TYPE

(71) Applicant: Vitop Moulding S.R.L., Alessandria (IT)

(72) Inventor: Diego Nini, Alessandria (IT)

(73) Assignee: Vitop Moulding S.R.L. (IT)

( * ) Notice: Subject to any disclaimer, the term of this patent is extended or adjusted under 35 U.S.C. 154(b) by 0 days.

(21) Appl. No.: 17/780,558

(22) PCT Filed: Dec. 1, 2020

(86) PCT No.: PCT/IT2020/050296

§ 371 (c)(1),
(2) Date: May 27, 2022

(87) PCT Pub. No.: WO2021/130788

PCT Pub. Date: Jul. 1, 2021

(65) Prior Publication Data

US 2022/0411253 A1 Dec. 29, 2022

(30) Foreign Application Priority Data

Dec. 24, 2019 (IT) ........................ 102019000025558

(51) Int. Cl.
*B67D 3/00* (2006.01)
*B67D 3/04* (2006.01)

(52) U.S. Cl.
CPC ........... *B67D 3/043* (2013.01); *B67D 3/0067* (2013.01)

(58) Field of Classification Search
CPC .............................. B67D 3/043; B67D 3/0067
See application file for complete search history.

(56) References Cited

U.S. PATENT DOCUMENTS 3,658,216 A * 4/1972 Schwartzman ......... G01F 11/32 222/453
4,452,425 A 6/1984 Lucking
6,470,910 B2 * 10/2002 Blackbourn ........... B67D 3/044 137/589
6,896,158 B2 * 5/2005 Leray ................. B65D 81/3283 222/484
7,455,281 B2 * 11/2008 Craft ...................... B67D 3/045 222/518

(Continued)

FOREIGN PATENT DOCUMENTS

WO 2008117250 A2 10/2008

OTHER PUBLICATIONS

Muller, Claus; PCT Int'l. Searching Authority, Written Opinion and Int'l. Search Report, from Application No. PCT/IT2020/050296, dated May 3, 2021, 8 pages.

*Primary Examiner* — Frederick C Nicolas
(74) *Attorney, Agent, or Firm* — UB Greensfelder LLP; John X. Garred

(57) ABSTRACT

A dispensing tap for liquids containers includes a main containing body equipped on one side with a liquid dispensing end and on the opposite side with an end designed to perform a connection with a container of liquids; a cap for actuating dispensing operations placed above the liquid dispensing end; and a stem for opening and closing the dispensing of liquids, placed inside the dispensing end and operatively coupled to the cap.

10 Claims, 22 Drawing Sheets

(56) References Cited

U.S. PATENT DOCUMENTS

| | | | | |
|---|---|---|---|---|
| 7,997,461 | B2 * | 8/2011 | Lester | B67D 3/043 222/509 |
| 8,091,743 | B2 * | 1/2012 | Lester | B67D 3/045 222/509 |
| 8,402,999 | B2 * | 3/2013 | Nini | B67D 3/044 137/533.19 |
| 2008/0237275 | A1 | 10/2008 | Lester et al. | |

* cited by examiner

DISPENSING TAP FOR RIGID AND FLEXIBLE CONTAINERS, PREFERABLY OF THE BAG-IN-BOX TYPE

BACKGROUND OF THE INVENTION

1) Field of the Invention

The present invention relates to a liquid dispensing tap, and more particularly to a dispensing tap for dispensing liquids, preferably with a density higher than that of water (for example oil, detergent and the like) from flexible or rigid containers, with double, integrated, anti-unscrewing and anti-counterfeiting ("tamper evident") system, exploiting the existing geometries on the containers, in the case of rigid containers, without asking the container manufacturers to make changes.

This fundamental aspect allows the inventive tap, unlike the outdated solution currently on the market, to comply with the new European and international directives on disposable plastic items (SUP) in order to avoid or give evidence of possible counterfeits.

The present invention refers to a liquid dispensing tap completely made of plastic material, which adapts, in a simple way and without requiring modifications, to existing systems that already use an outdated version of the cap.

The inventive tap also finds a not limiting application both to a flexible container, preferably of the Bag-In-Box (hereinafter BIB) type, using the specific version for BIB containers, and to a rigid container, in which two holes are generally made: one is used to "house" the liquid dispenser/dispenser cap, while the other is used to fill the drum; this second opening also acts as an "air inlet" in order to avoid the collapse of the rigid container and the consequent interruption of the supply of liquid during the tapping phase of the liquid itself, and therefore during normal use of the container, in the event that a normal dispensing tap is connected to the other hole.

2) Background Art

For most of the rigid containers on the market, the second hole (i.e. the one that is closed in the production cycle by means of a "normal" cap) also acts as an air inlet when using the tap (in practice it is so that the second hole remains at the top, during use, with respect to the tap, giving the user the possibility of being able to open it to let the air in and therefore not to create that depression inside the container, which inhibits the use of the tap itself).

The liquid dispensing tap of the present invention preferably consists of three components: body, elastic cap and stem, and two of these, elastic cap and stem, are perfectly reusable when both the version for flexible containers, preferably BIB, and the version for rigid containers, by modifying only the rear geometry of the main body, as will be seen later.

There is an inventive solution on the market that can be considered the progenitor of this type of tap: it is described in US-B1-4452425.

This prior art tap however has limitations due to the conformation of its components.

For example, in the BIB version, highlighted on the drawings of the patent indicated above, there was no effective system on the back of the cap, which is the part that must be inserted into the nozzle for connection with the bag (in the BIB version) extraction, which definitively blocks the dispensing tap on the connection spout with the flexible bag.

This allows the removal of the old-concept dispensing tap and the filling of the container connected to it with counterfeit products.

Furthermore, the fact that the tap is not blocked together with the rest of the container, does not make the application compliant with the new European and international directives on disposable plastic items (SUP).

Again, if we continue to analyze the inventive tap of the prior art, we note that in its previously exposed BIB version, on its front part, there are no stem centering geometries and, if they are present, as in some copies now countless on the market or as highlighted on the drawings of document US-A-2008/237275, which in fact also geometrically illustrate the version currently on the market, they are arranged too close to the conical sealing geometries of the liquid outlet hole, causing possible deformations on the cone seal itself, which could then be the cause of a possible fluid leak.

Furthermore, on the old version, and especially on the version for rigid containers, the conformation of the connection channel between the rear part (interlocking if we are talking about the BIB version or screwing if we are analyzing the version for rigid containers) and the front, where the stem and elastic cap components are placed, is shaped so that, at the end of the life of the container, a lot of liquid remains inside the same, which is dispensable, only partially, only if the container is tilted.

Furthermore, the very conformation of this connecting channel, which is preferably with a square or rectangular section, does not allow for a large flow, ultimately limiting its potential performance.

SUMMARY OF THE INVENTION

Object of the present invention is solving the above prior art problems by providing a liquid dispensing tap formed by three plastic components which is equipped with anti-counterfeiting and anti-removal solutions and with a conformation such as to allow the production of a dispensing tap of superior quality, also optimizing its production costs.

A further object of the present invention is providing a tap that uses components that are shaped in such a way as to use less plastic as possible, lightening some geometries and therefore giving a "green" character to the application, which will require less plastic for its production and therefore less energy to produce it, as the production cycles themselves are shorter and less expensive: this also has a positive effect on the final price of the dispenser itself.

A further object of the present invention is providing a tap as indicated above, which allows obtaining "balanced" centering geometries inside that do not transmit any deformation to the critical sealing areas of the application itself, ensuring a perfect seal against liquids.

A further object of the present invention is providing a tap which optimizes performance in terms of maximum deliverable flow, in comparison with the old version available on the market.

A further advantage is that the inventive tap adapts to existing production systems, without requiring changes to users of the old version. In practice, it is possible to obtain all the advantages listed above, without changing the dimensions and functional geometries for average customers (filling centers) and final customers (end user of the application).

The aforementioned and other objects and advantages of the invention, which will appear from the following description, are achieved with a dispensing tap as the one claimed in claim 1. Preferred embodiments and non-trivial variations of the present invention are the subject of the dependent claims.

It is understood that all attached claims form an integral part of the present description.

It will be immediately obvious that innumerable variations and modifications (for example relating to shape, dimensions, arrangements and parts with equivalent functionality) can be made to what has been described without departing from the scope of the invention as appears from the attached claims.

BRIEF DESCRIPTION OF THE DRAWINGS

The present invention will be better described by some preferred embodiments, provided by way of non-limiting example, with reference to the attached drawings, in which.

DETAILED DESCRIPTION OF PREFERRED EMBODIMENTS

Figure 1:
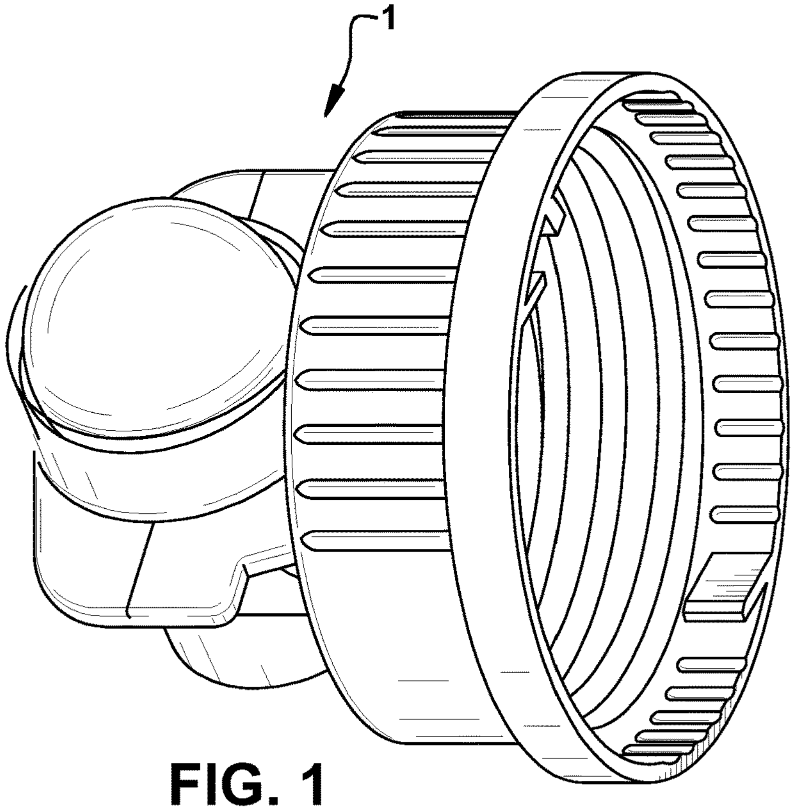
FIG. 1 is a perspective view of an embodiment of the tap according to the present invention in the closed position.
Figure 2:
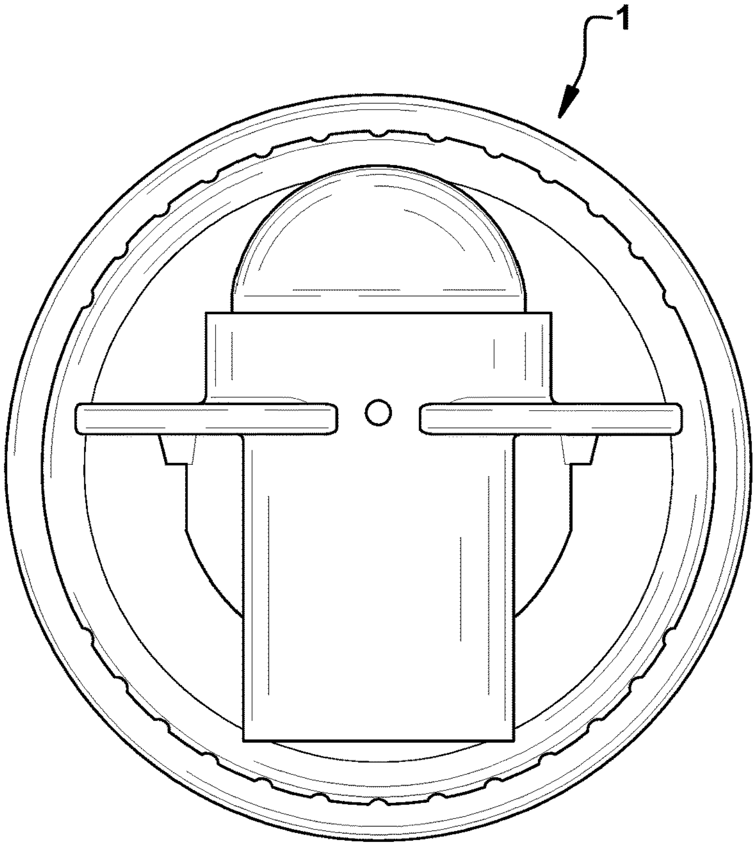
FIG. 2 is a front view of an embodiment of the tap according to the present invention in the closed position.
Figure 25:
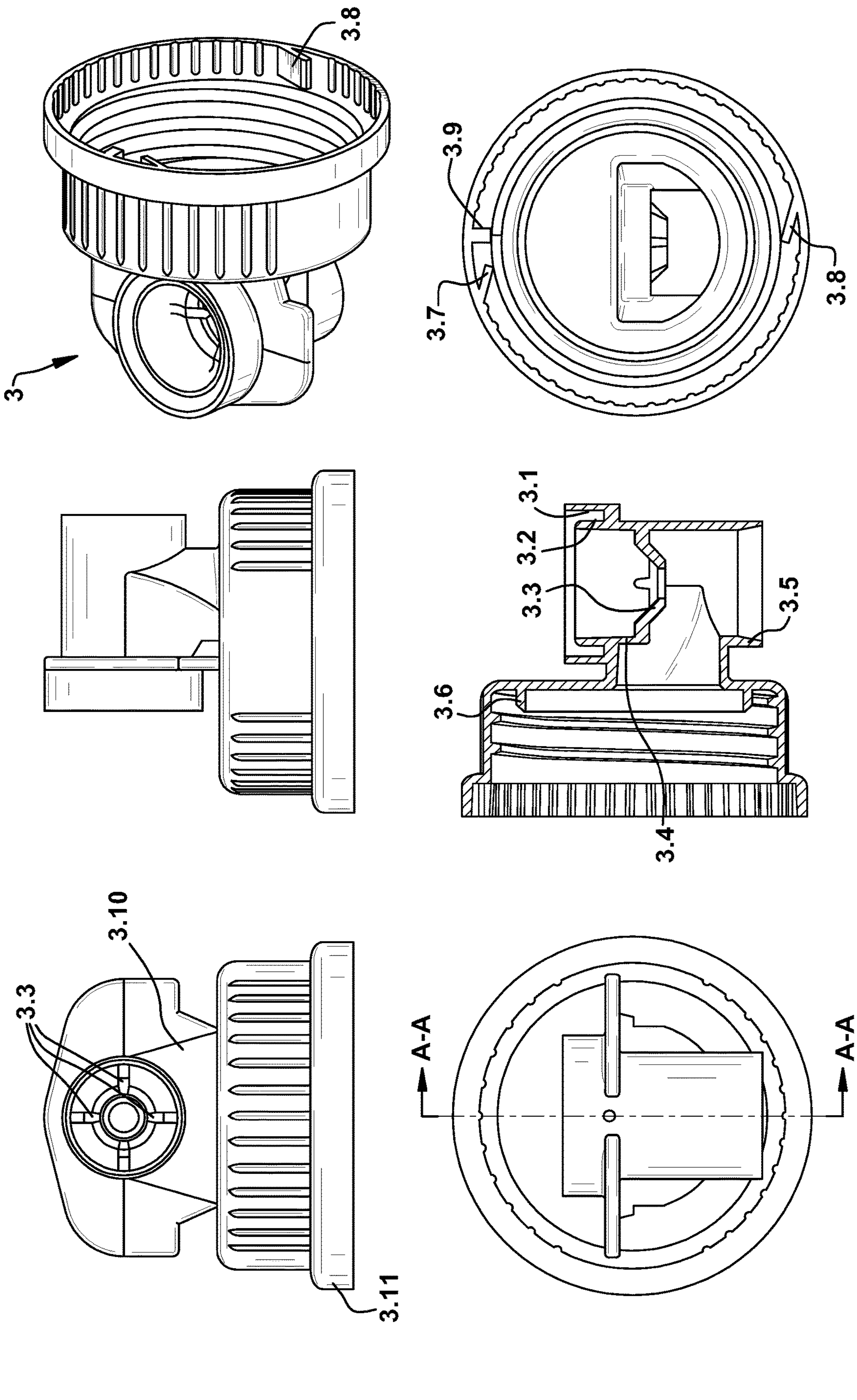
FIG. 25 are perspective, side, front, top, bottom and side sectional views of the main body in its configuration suitable for rigid containers with coupling thread.

A first embodiment of the tap 1 of the invention is shown in FIG. 1, and uses a first body 3 in FIG. 25.

Figure 10:
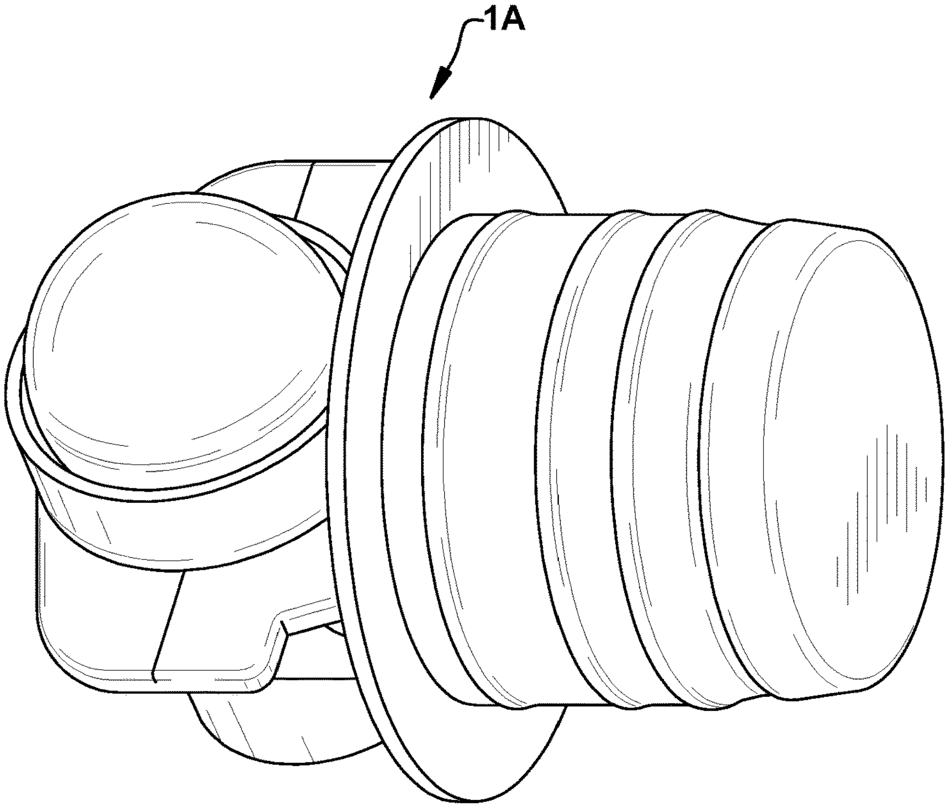
FIG. 10 is a perspective view of an embodiment of the tap according to the present invention in the closed position.
Figure 11:
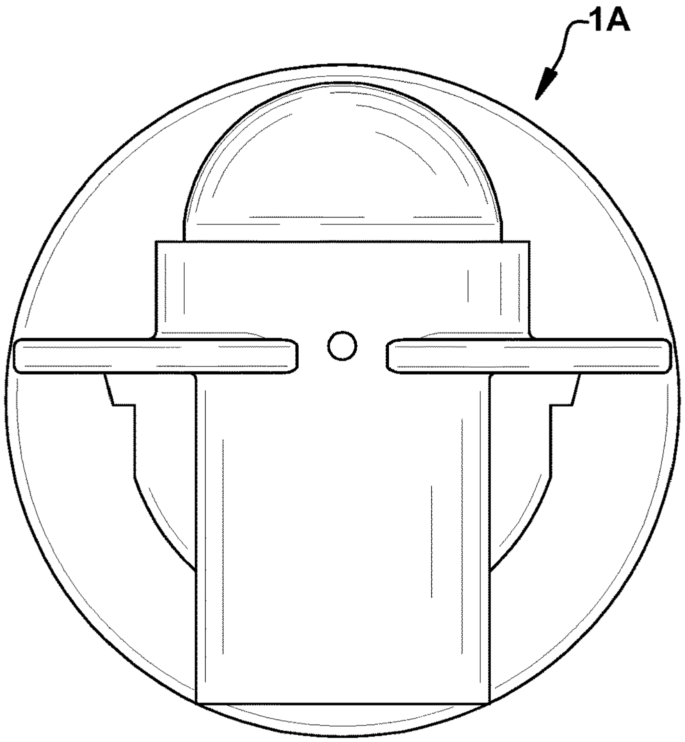
FIG. 11 is a front view of an embodiment of the tap according to the present invention in the closed position.
Figure 12:
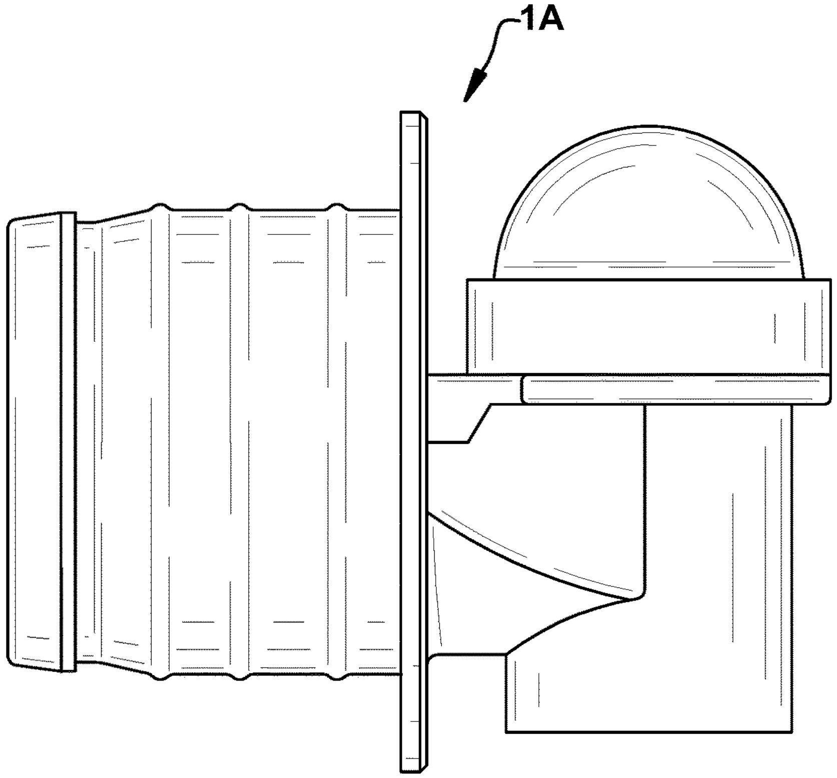
FIG. 12 is a side view of an embodiment of the cock assembled according to the present invention in the closed position.
Figure 13:
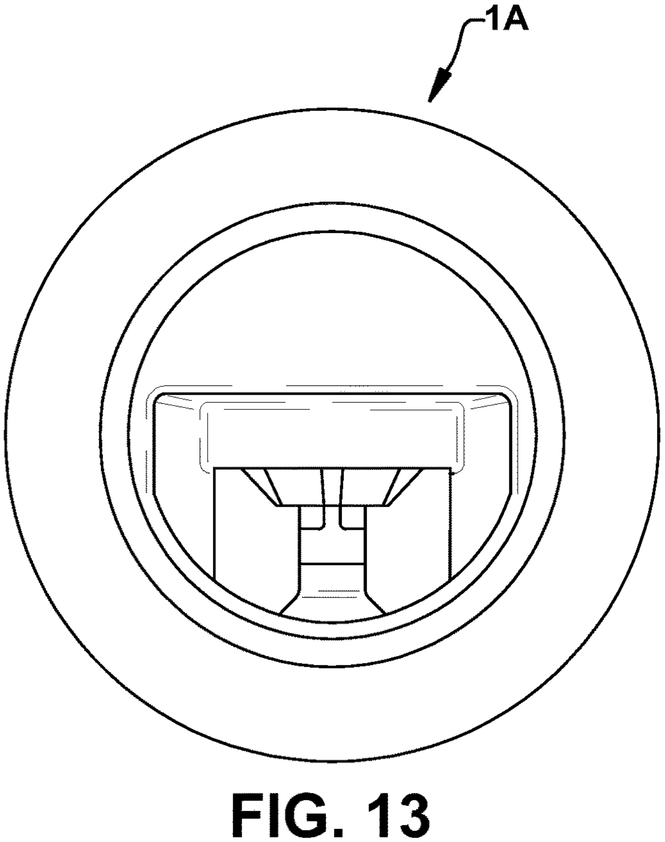
FIG. 13 is a rear view of an embodiment of the tap according to the present invention in the closed position.
Figure 26:
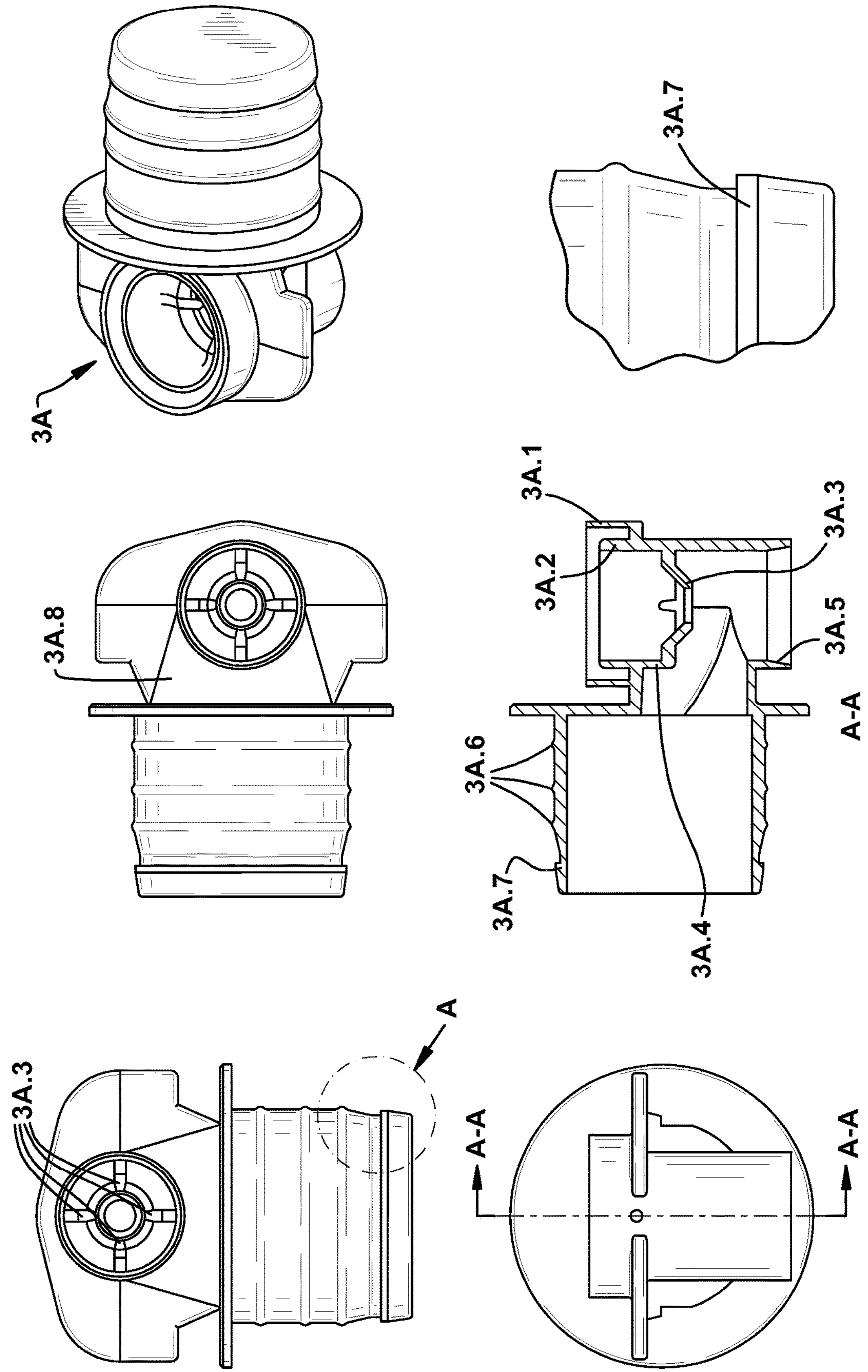
FIG. 26 are perspective, side, front, top, bottom and side sectional views of the main body in its configuration suitable for flexible containers, preferably BIB.

A second embodiment of the tap 1A of the invention is shown in FIG. 10, and instead uses a second body 3A (shown in detail in FIG. 26).

They comply, in both versions (tap 1 in FIG. 1 and tap 1A in FIG. 10), with the new European and international directives on disposable plastic items (SUP), thanks to geometries that allow, unlike the old technologies present on the market, to obtain dispensers which, once placed on the final containers, remain firmly and immovably bound to them.

Furthermore, thanks to the special conformation of the front dispensing channel and the positioning of the internal geometries, a tap qualitatively superior to the competition on the market is obtained, and above all a dispenser is obtained that allows tapping most of the liquid contained inside the containers, drastically reducing the "end of life" residue inside the container.

Again, thanks again to the conformation of the main bodies 1 and 1A, there is a greater supply flow.

Figure 3:
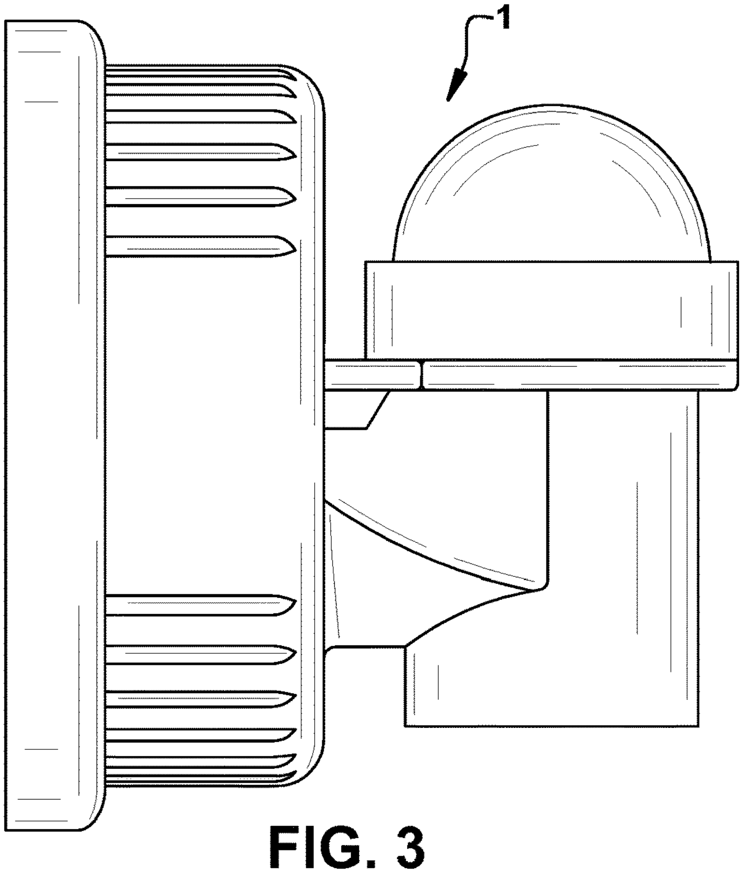
FIG. 3 is a side view of an embodiment of the tap assembled according to the present invention in the closed position.
Figure 4:
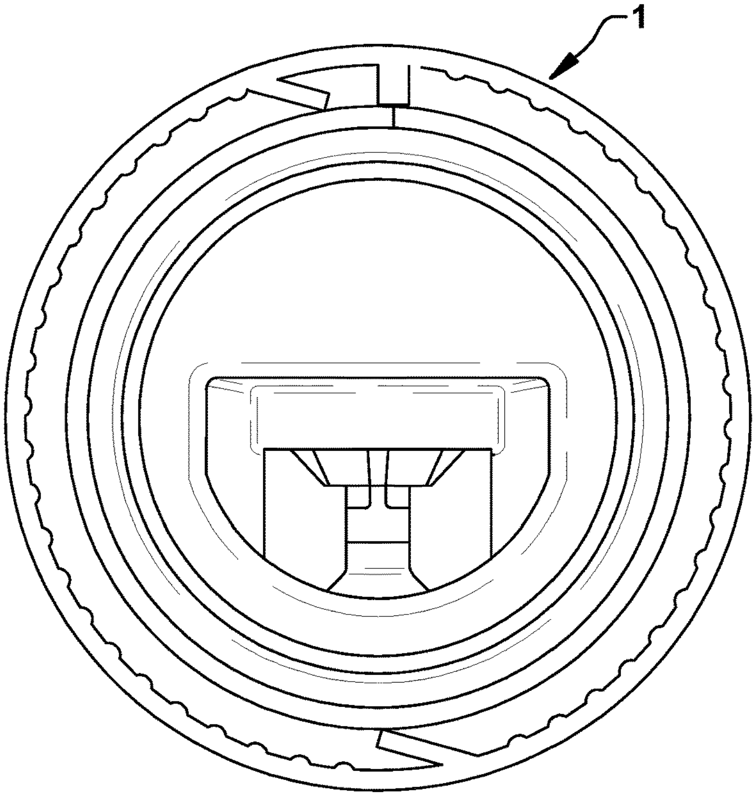
FIG. 4 is a rear view of an embodiment of the tap according to the present invention in the closed position.
Figure 22:
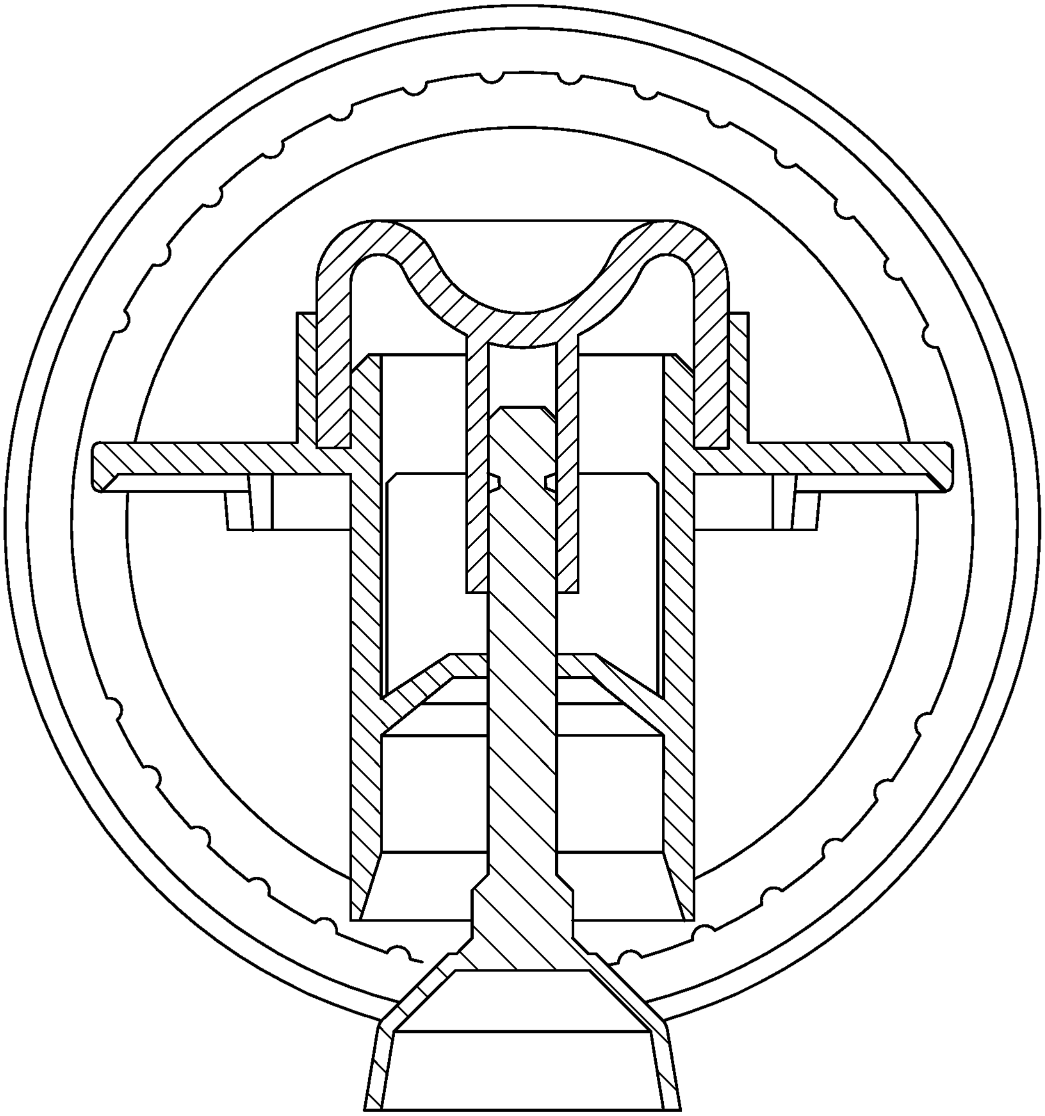
FIG. 22 is a sectional front view in the open position of the old-fashioned tap currently on the market.

Furthermore, thanks to the new internal conformation of the front cylinder and the location of the centering geometries 3.3 of the stem 4 of FIGS. 25 and 3A.3 of FIG. 26, and the creation of the cylinder 3.4 of FIGS. 25 and 3A.4 of FIG. 26, which allows placing four symmetrical ribs connected to the upper part of the tap (and not as in the old technology to the lower part as shown in FIG. 22), it is possible to avoid the transmission of deformations to the main sealing cone 3.5 of FIGS. 25 and 3A.5 of FIG. 26, eliminating possible problems of deformed pieces that would cause fluid leaks from the application itself.

Moreover, it is possible to provide both versions of the inventive dispensing tap 1 and 1A with characteristics such as to make both versions immovable and counterfeit-proof, once placed on the containers.

Furthermore, it is possible to optimize the use of plastic in the various components by increasing the "green" character of the application, in terms both of environmental impact and of greater and faster production of the components themselves.

The interesting aspect is that it is possible to obtain the above advantages without requiring any changes to the customer who today uses the old-fashioned tap.

In practice, the old dispenser is removed from the production line and replaced with the new inventive tap 1 of FIG. 1 and/or 1A of FIG. 10, without having to change anything in the production cycle.

With reference to the Figures, a preferred embodiment of the liquid dispensing tap 1 of the present invention is shown, in its vertical application. It will be immediately evident that the inventive tap 1 can also be used in its horizontal version, with minimal adjustments, within the capabilities of a common person skilled in the art.

Going into the detail of the two configurations described here, they are made up of three components, two of which are used for both versions (i.e. stem 4 and elastic cap 2).

In the first configuration, in addition to the two aforementioned components, the dispensing tap 1 (for the version, preferably but not limitedly, screwed onto rigid containers) also comprises a main containing body 3 (better shown in FIG. 25). Leaving aside the geometries and external shapes, as the inventive dispenser tap 1 must aesthetically and geometrically comply with the old-fashioned tap version on the market, so as not to require changes to the current production cycle, its new and innovative features are mentioned below.

On the front, there is a cylinder inside which all the useful geometries for connection and hermetic sealing of the tap are obtained. In detail in FIG. 25, it is possible to note an upper external sealing seat 3.1 of the cap 2 of FIG. 23, and an internal sealing geometry 3.2 which hermetically mates with the internal geometry 2.2 of the flexible cap of FIG. 23.

Furthermore, there is a cylindrical geometry 3.4 (FIG. 25) inside which four arms 3.3 are obtained (placed mutually at 90°), which are connected to a central cylinder and form the guiding geometry of the stem 4.

Figure 24:
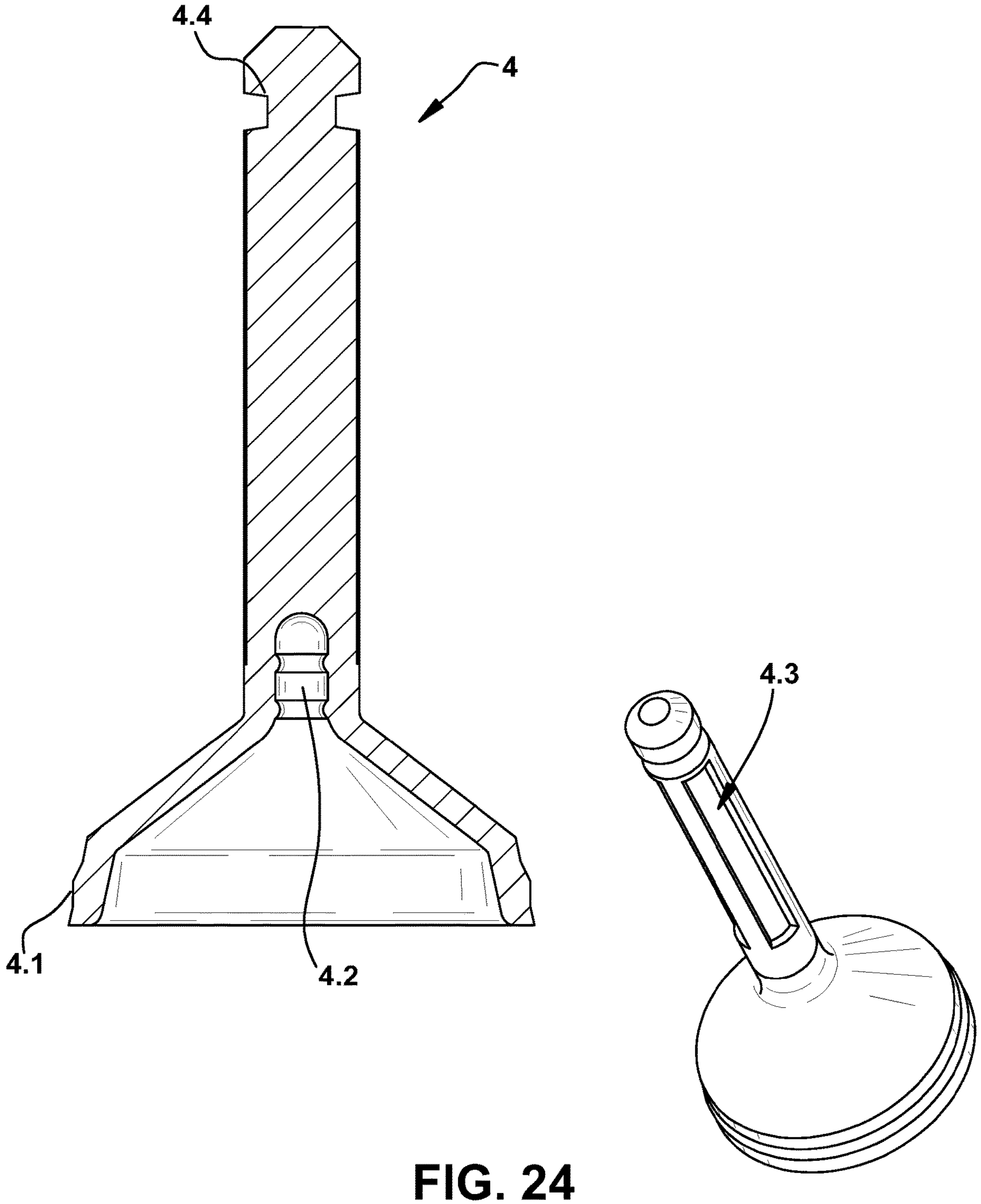
FIG. 24 is a perspective and side sectional view of the stem.

Observing FIG. 25, it is possible to note the characteristic conical geometry of the seal 3.5, which is designed to couple with the conical geometry of the stem 4 of FIG. 24, generating, when the tap 1 is in the closed position, a hermetic seal.

Figure 7:
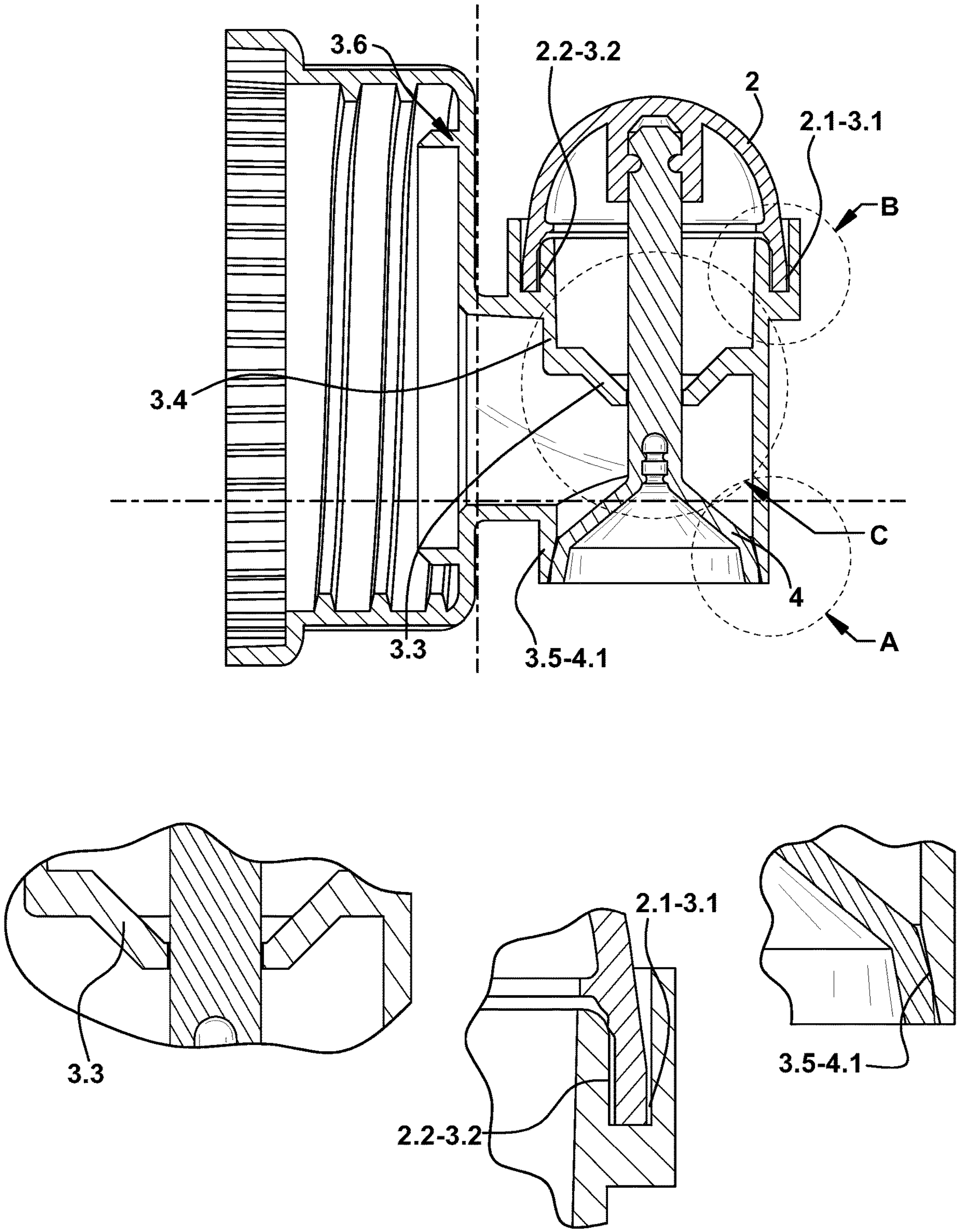
FIG. 7 is a sectional side view and various details of an embodiment of the tap according to the present invention.
Figure 8:
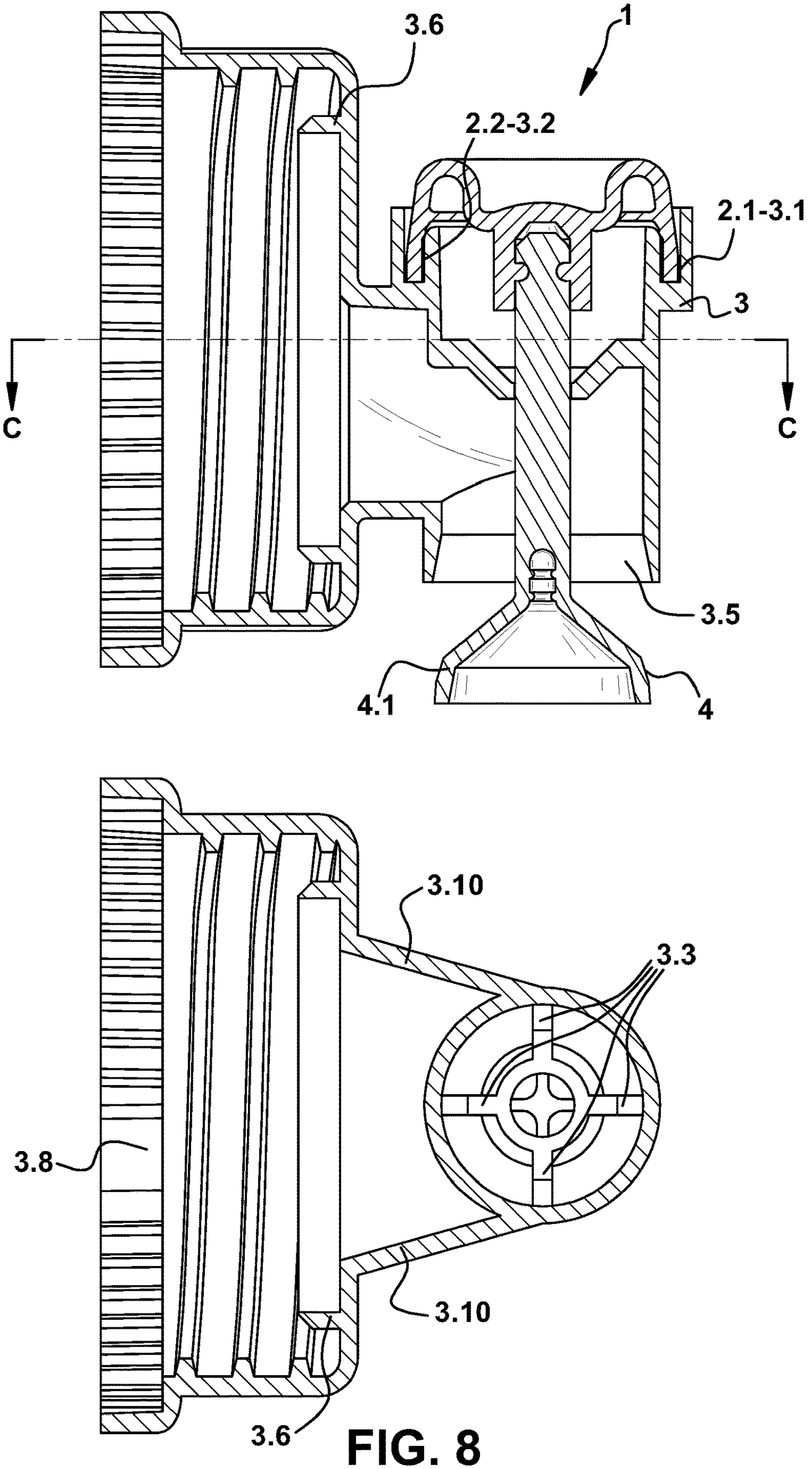
FIG. 8 is a side and top sectional view of an embodiment of the tap according to the present invention in the open position.

Referring to FIG. 7, and having just analyzed the right part, it is possible to note the connection channel between the right part (delivery end) and the left part (connection end) of tap 1, i.e. the connection channel 3.10 of FIG. 8. This is shaped in order to obtain the maximum supply and the least residual liquid inside the container at its "end of life".

Figure 27:
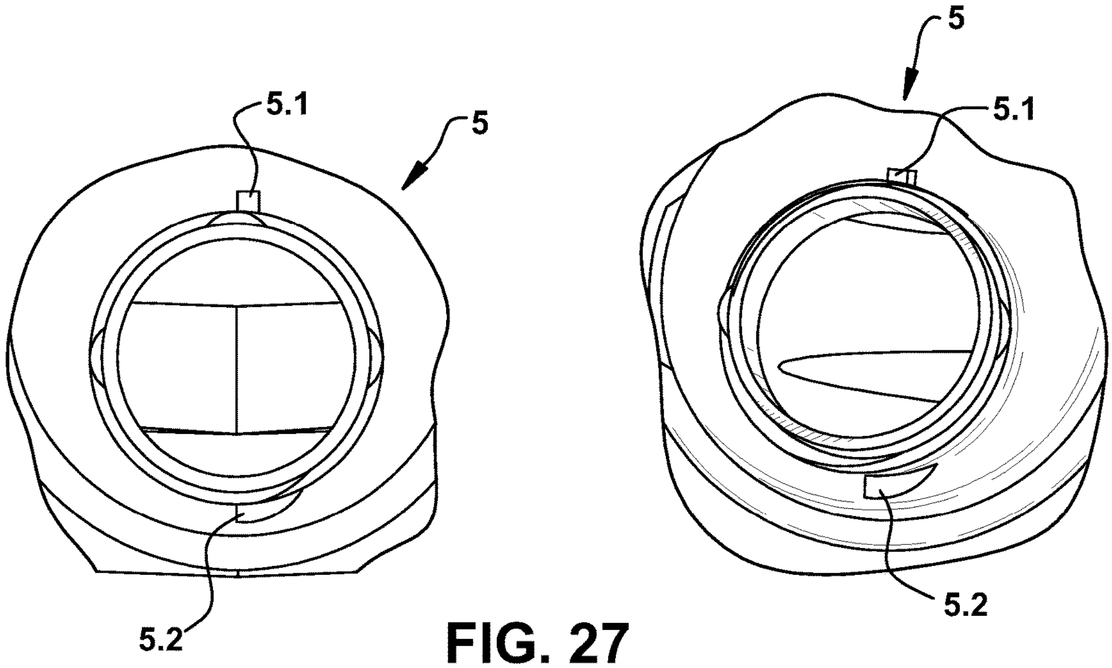
FIG. 27 is a perspective and front view of the neck of the rigid container currently on the market.

Referring to FIG. 7, on the left side the threaded connection geometries are obtained, together with the sealing geometries 3.6 with a rigid container (not shown), and above all the locking geometries 3.7 and 3.8 of FIG. 25, which cooperate together to the geometry for a "stop in position" 3.9 of FIG. 25, which has the purpose of correctly orienting the inventive tap 1 on the container 5 of FIG. 27, once screwed completely, cooperating with the geometries present on the neck of the container itself.

In the second configuration, in addition to the two aforementioned components, the dispensing tap 1 (for the version for connection with semi-rigid and/or flexible containers) also comprises a main containing body 3A (FIG. 26). Also in this case, leaving out the geometries and external shapes, as the inventive dispenser tap 1 must aesthetically and geometrically comply with the outdated version on the market, so as not to require changes to the current production cycle, its new innovative features will be indicated below.

On the front part there is a cylinder, inside which all geometries useful for connection and hermetic sealing of the tap 1 are obtained. In detail in FIG. 26, there is an upper seat 3A.1 for external sealing of the cap 2 of FIG. 23, and an internal sealing geometry 3A.2, designed to hermetically couple with the internal geometry 2.2 of the flexible cap of FIG. 23.

Furthermore, there is a cylindrical geometry 3A.4 (FIG. 26) inside which four arms 3A.3 are obtained (mutually at 90°) which connect to a central cylinder and form the guide geometry of the stem 4.

Observing FIG. 26, we note the characteristic conical geometry of the seal 3A.5, designed to couple with the conical geometry of the stem 4 of FIG. 24, generating, when the tap is in the closed position, a hermetic seal.

Figure 16:
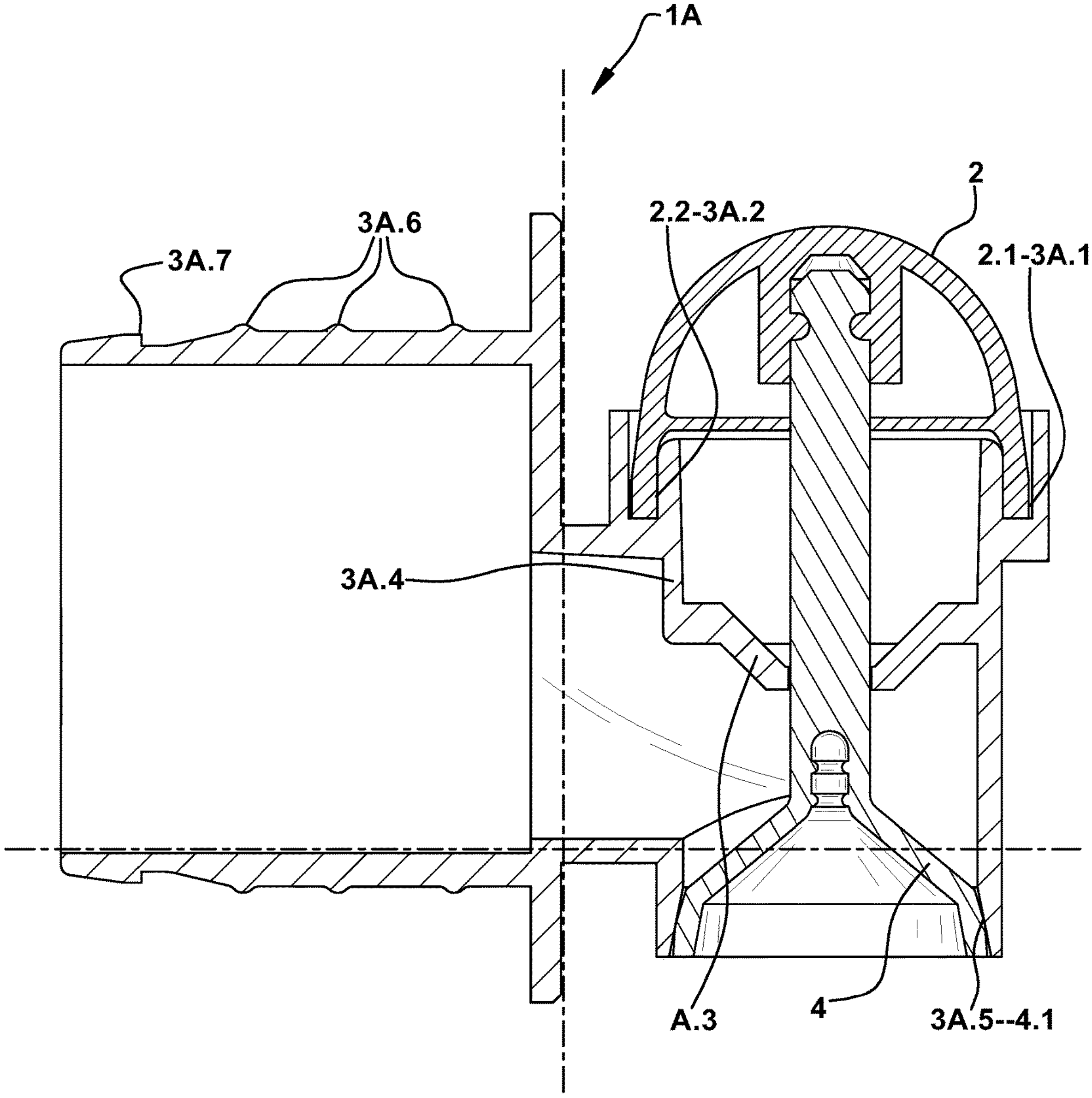
FIG. 16 is a sectional side view and various details of an embodiment of the tap according to the present invention.
Figure 17:
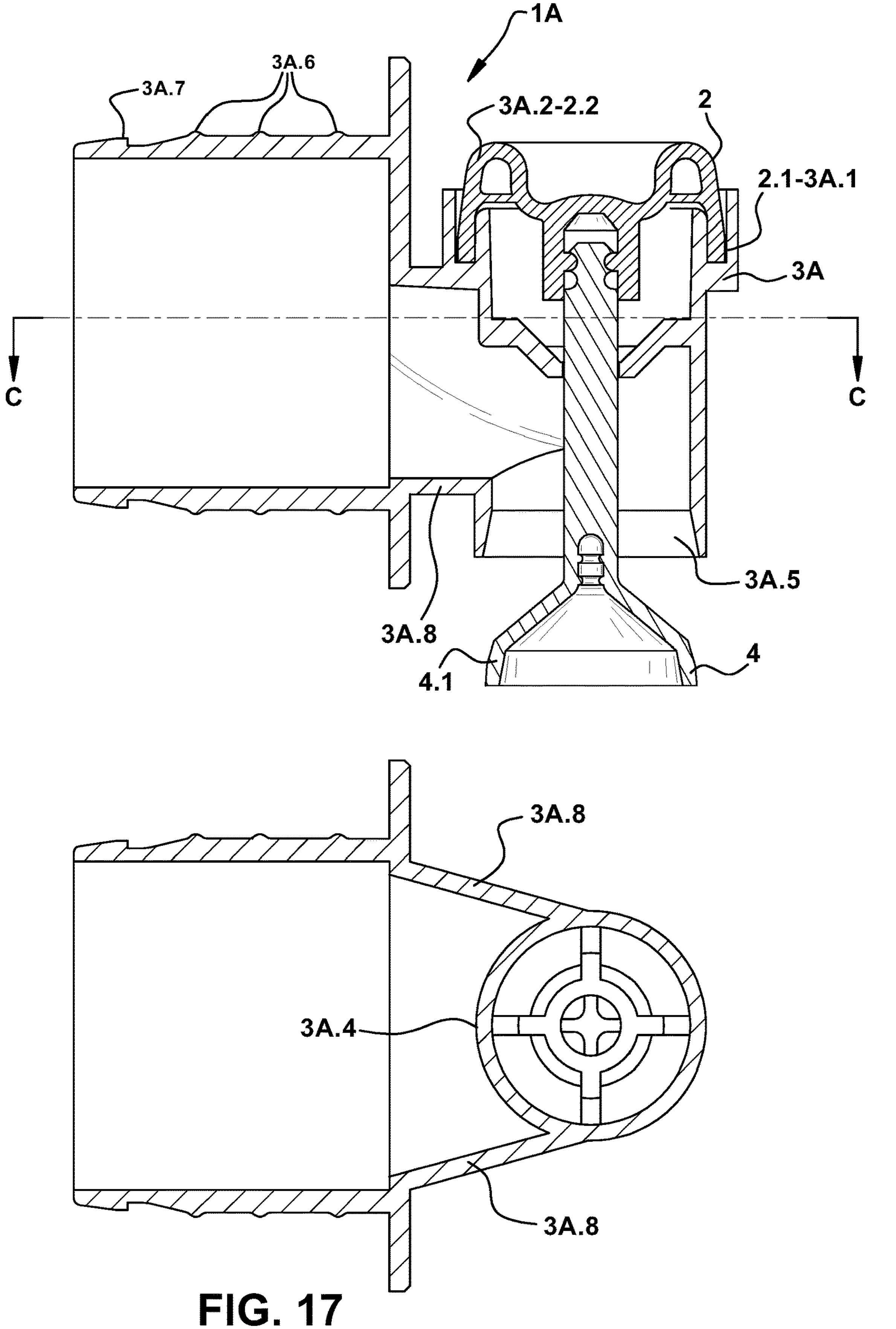
FIG. 17 is a side and top sectional view of an embodiment of the tap according to the present invention in the open position.

With reference to FIG. 16 and having just analyzed the right part, the connection channel is described between the right part and the left part of the tap 1, that is the connection channel 3A.8 of FIG. 17. This is conformed in order to obtain the maximum supply and the least residual liquid inside the container at its "end of life".

With reference to FIG. 16, the left part (connection end) is described, where the connection and sealing geometries with the nozzle 3A.6 are obtained and above all the locking geometries 3A.7 of FIG. 26, which cooperate together with the internal geometry 6.1 with sharp edge of the connection spout 6 (FIG. 28) of a container (not shown), generating a stable and immovable coupling, and creating, according to one of the objects of the invention, an anti-removal and anti-counterfeiting system, for the benefit of the final user customer.

Figure 23:
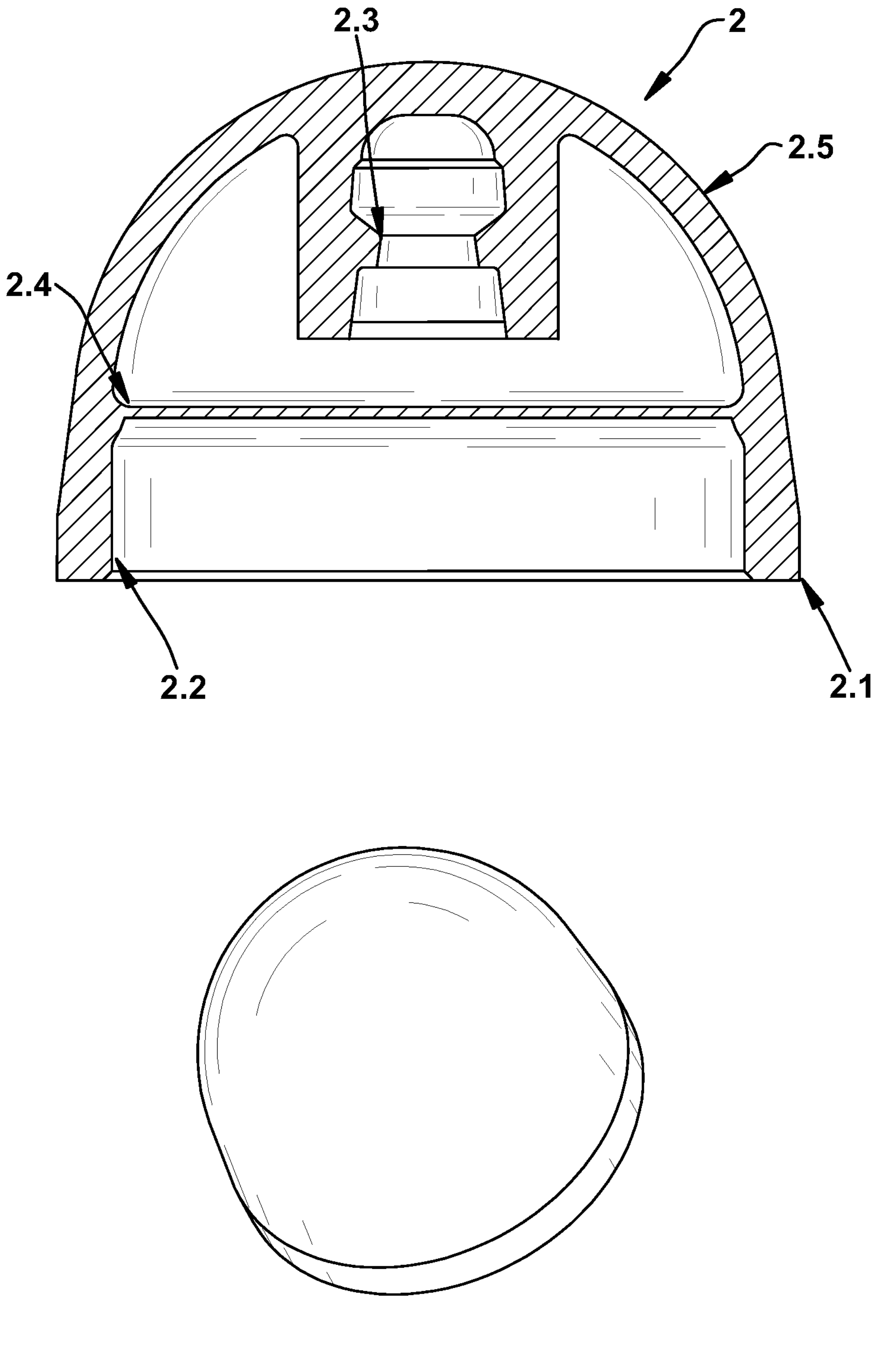
FIG. 23 is a perspective and side sectional view of the elastic cap.

As regards the stem 4, which is one of the two elements in common for both versions listed above, it is better shown in FIG. 24. It shows the undercut coupling geometry 4.4, which cooperates with a similar geometry obtained on the elastic button 2 (FIG. 23). The elongated part 4.3 is unloaded, to lighten the piece and increase its productivity, as well as to characterize its "green" appearance, as less plastic material will be used to produce it. Finally, there is a conical geometry on which the ring geometry 4.1 is obtained (FIG. 24) which is coupled with the conical geometry (3.5, 3A.5) obtained on the body (3, 3A), generating the hermetic seal of the tap 1, 1A in both versions.

Finally, as regards the elastic cap 2 (better shown in FIG. 23), it is the last element forming the inventive tap 1, and is also used for both versions of tap, 1 and 1A. Inside the cap 2, a cylinder is housed in which the geometries 2.3 are obtained, useful for stably binding the stem 4. The "dome" geometry and the use of special flexible polymeric material guarantees the spring effect useful for automatically reclosing the tap 1. There are an external surface 2.1 and an internal surface 2.2, which are designed to come into contact and operational interference with the geometries of the two main containment bodies 3 and 3A, guaranteeing perfect hermetic sealing on the upper part of the inventive tap 1.

Inside the cap 2 there is a special "retentive" geometry, useful in the molding phase of the component to facilitate its extraction and therefore to speed up the production cycle, making it cheaper to produce in pieces.

Figure 5:
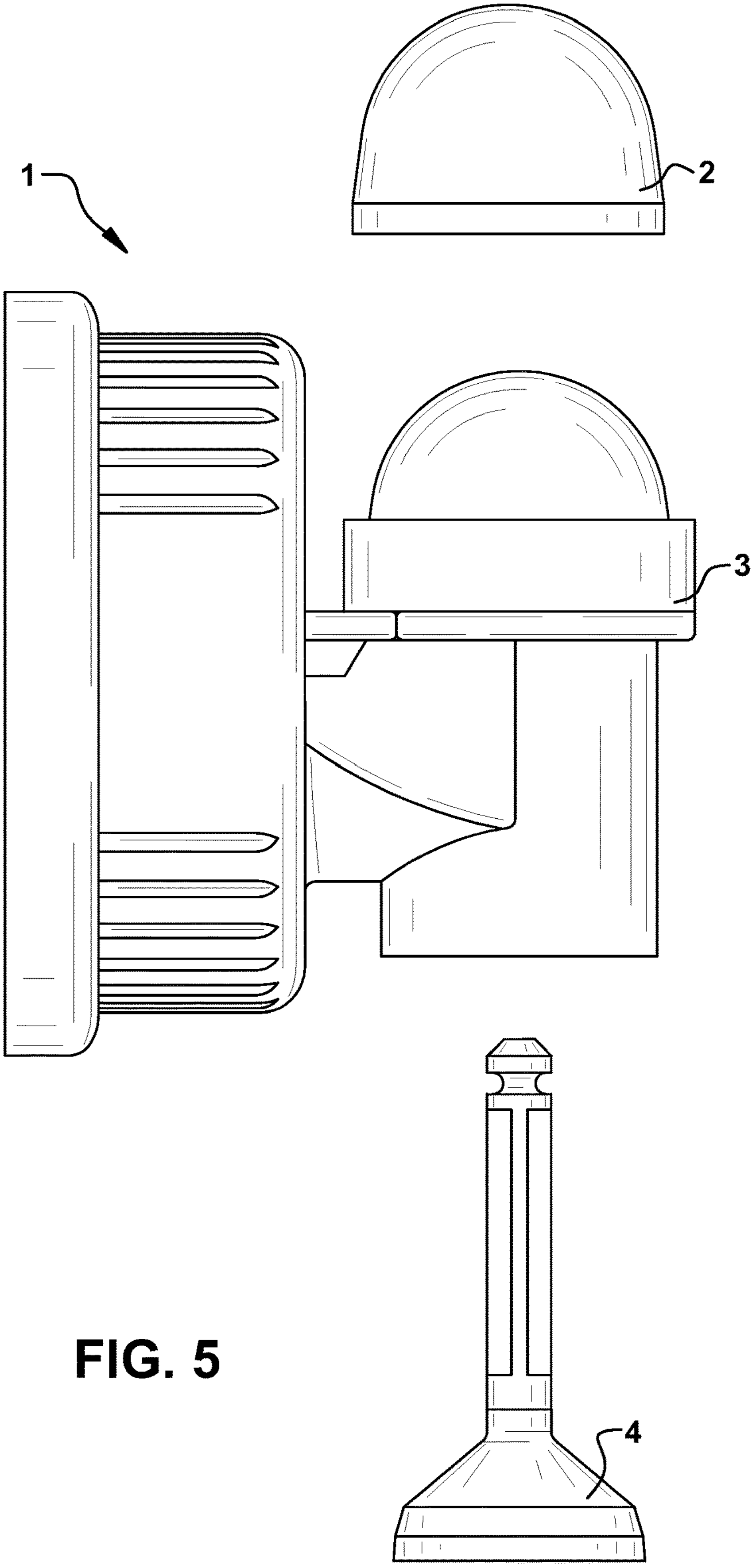
FIG. 5 is an exploded side view of an embodiment of the tap according to the present invention in the closed position.
Figure 6:
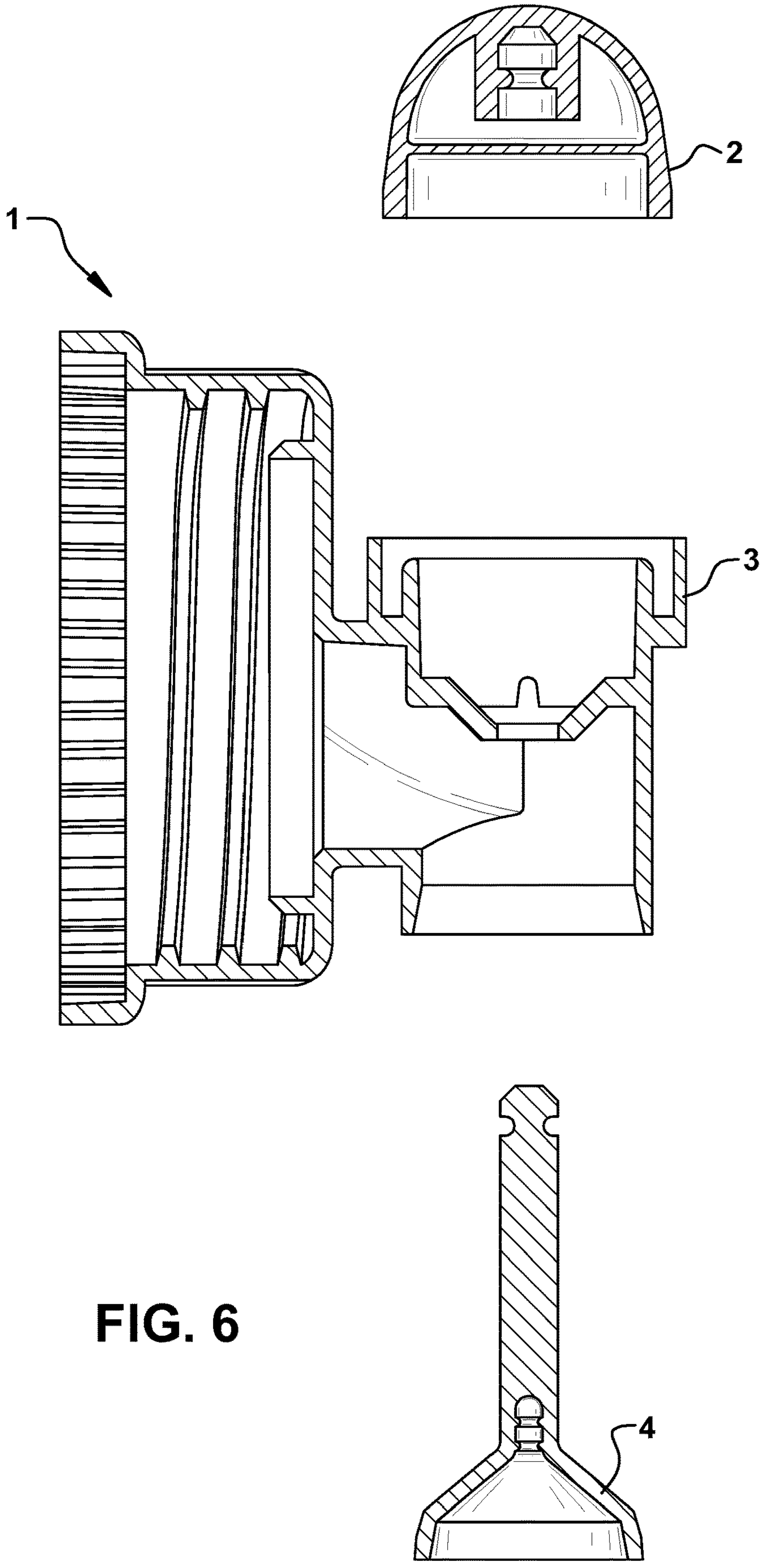
FIG. 6 is an exploded sectional side view of an embodiment of the tap according to the present invention.
Figure 14:
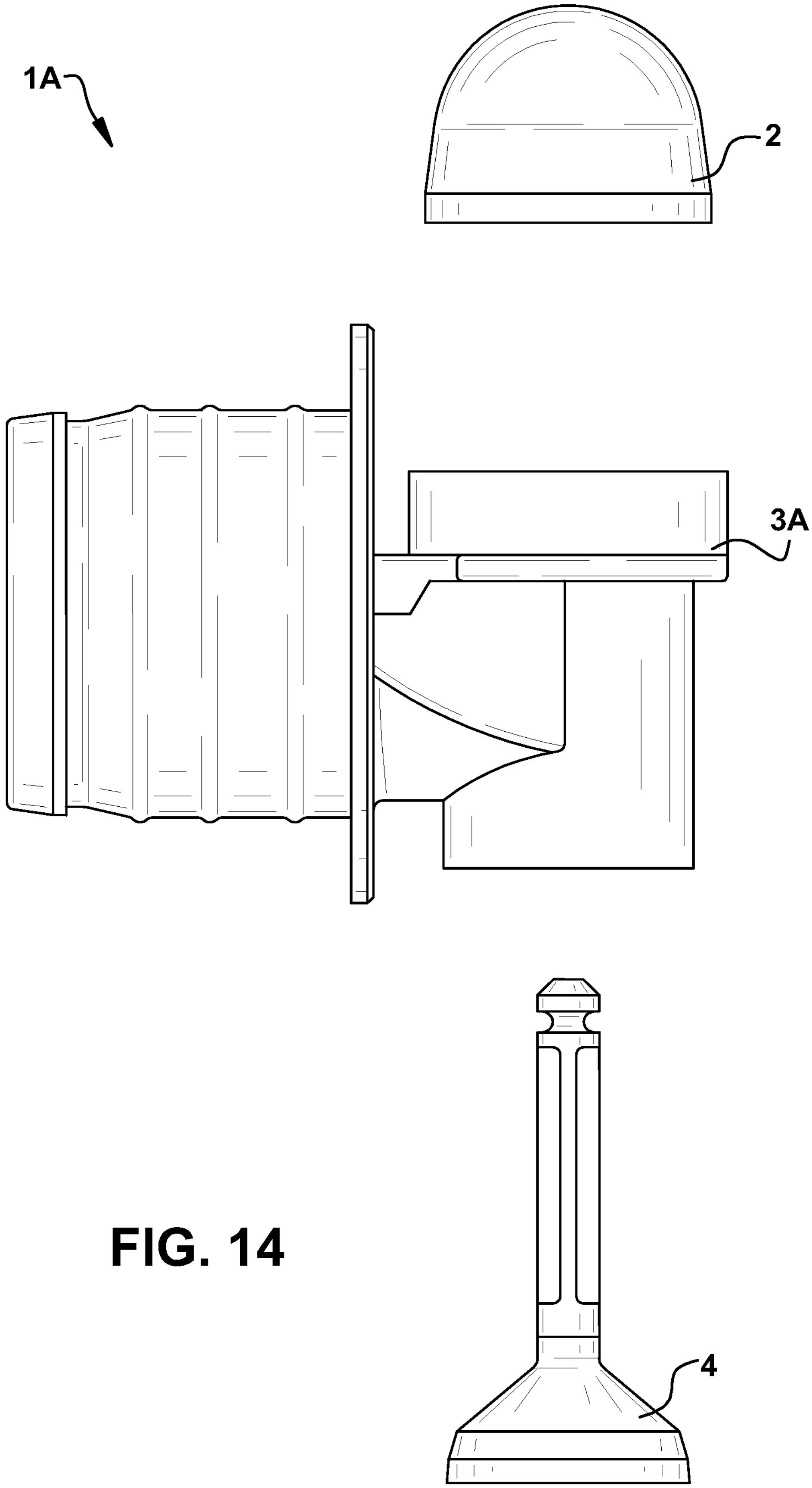
FIG. 14 is an exploded side view of an embodiment of the tap according to the present invention in the closed position.
Figure 15:
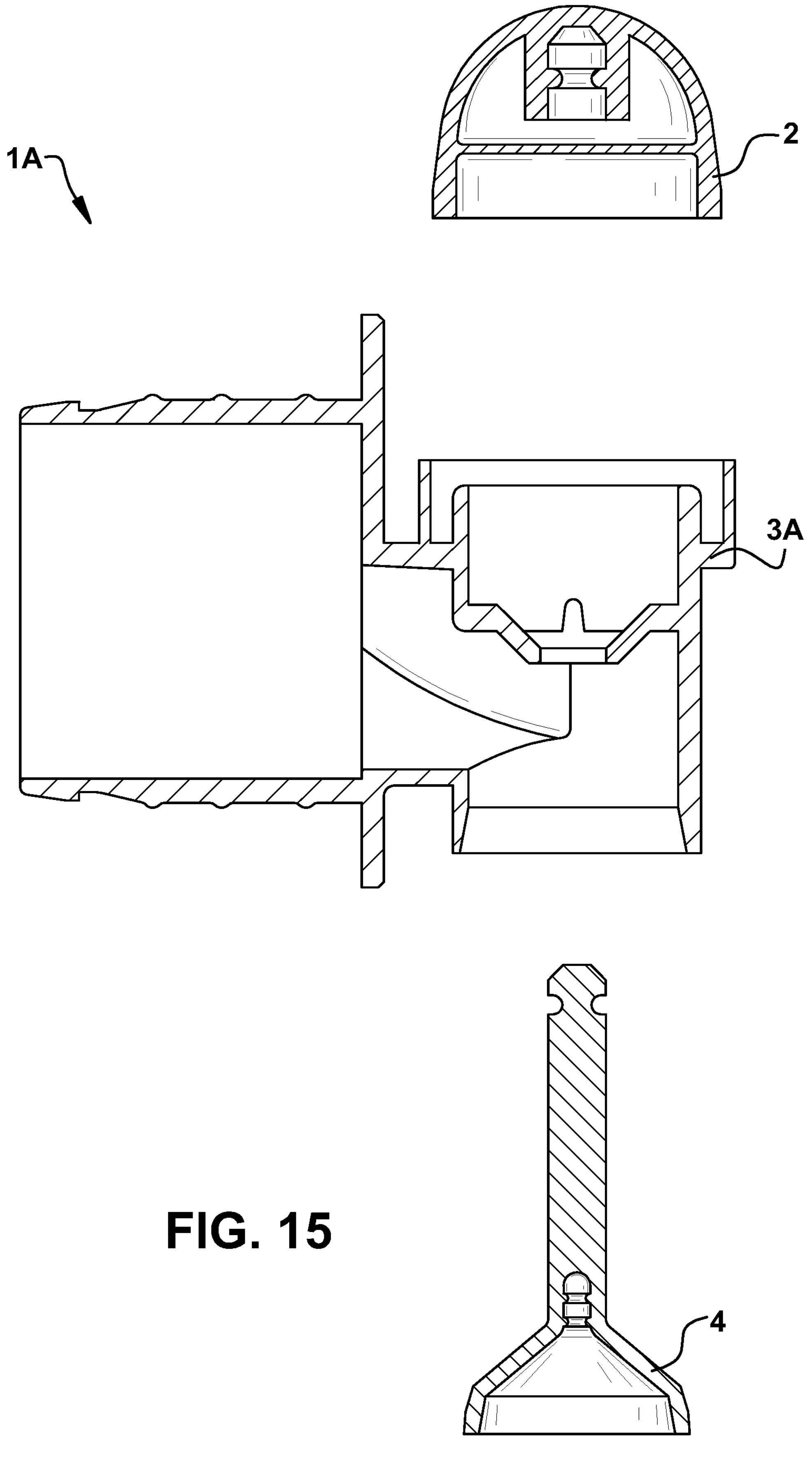
FIG. 15 is an exploded sectional side view of an embodiment of the tap according to the present invention.

Referring now to FIGS. 5 and 6 as regards the inventive tap 1 for rigid containers, and to FIGS. 14 and 15 as regards the tap 1A for semi-rigid and/or flexible containers, preferably BIB, it is noted how the components are assembled: specifically, on the main containing body 1, 1A the elastic cap 2 is placed on the upper part, while the stem 4 is stably and hermetically bound underneath.

With reference to FIGS. 1 to 9, the inventive tap 1 is shown in its preferred configuration, designed to adapt to the most widespread rigid containers (5 in FIG. 27) on the market. As a fundamental detail in the development of this inventive tap 1 of FIG. 1, it is necessary to consider the geometry of the neck of the rigid container 5 of FIG. 27, which has a well-defined geometry and dimension, and has only two geometries 5.1 and 5.2, useful and available to try to create a geometry on the inventive tap 1, which definitively blocks the tap 1 to the container 5 once connected, so as to comply with the new European and international directives on disposable plastic devices.

Furthermore, the aforementioned system must allow the liquid contained inside the rigid containers 5 to be protected from counterfeiting.

And again, it is necessary to find a method to prevent the tap 1 from being unscrewed by children by creating a kind of childproof system.

The current market requires that the tap 1 cannot be removed from the container 5 once applied, for two main reasons (especially if there is only one liquid outlet and therefore there is no second cap for ventilation):

1. safeguarding the image of the company which must protect itself from counterfeiting. If you take as an example a company that sells detergent, it must be sure that, at the end of use, the tap 1 is not removed and the container 5 is not filled with inferior liquids and put back on the market;

2. safety: the market requires safety technologies to protect children, so that, especially in the case where the container 5 contains liquids that are dangerous to human health if swallowed (such as detergents), the container 5 has a tap 1 that is difficult to remove unless you break it. This guarantees extreme safety against possible ingestion by a child.

Naturally, the market requires that these technologies be obtained on tap 1. The neck that is usually found on the market (the most common especially in America, but also in Europe) is the 33 mm neck.

The current invention aims to obtain anti-counterfeiting and child-protection geometries on the inventive tap 1, which use the geometries of the standard neck on the market as an anchor, without requiring costly modifications to the customer.

The flexible cap 2 and the stem 4 are reusable, also for the 1A tap version developed for semi-rigid and/or flexible containers, thus increasing the "green" spirit of the application, which uses the same equipment to create the components of two completely different versions.

Figure 9:
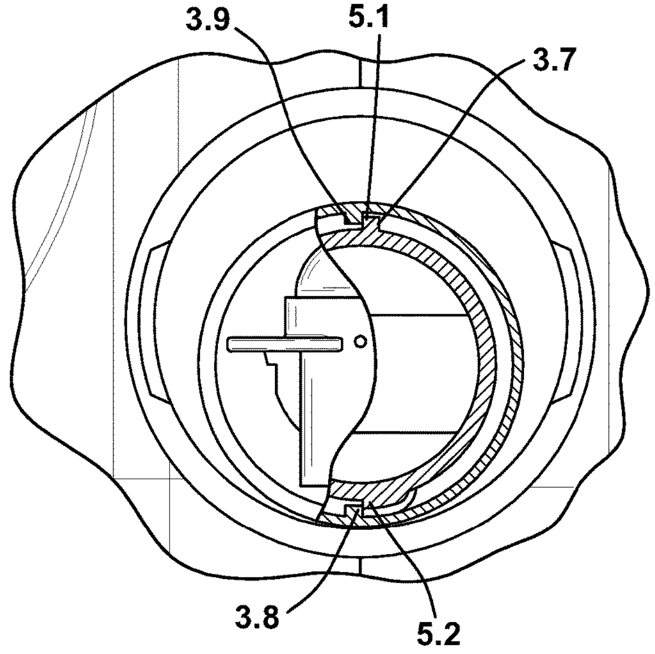
FIG. 9 is a front view in partial section, a side view in complete section and an isometric view of an embodiment of the tap according to the present invention mounted on the rigid container.
Figure 9:
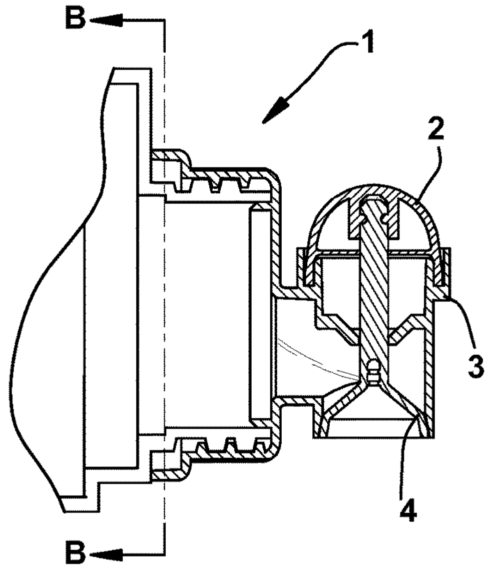
Figure 9:
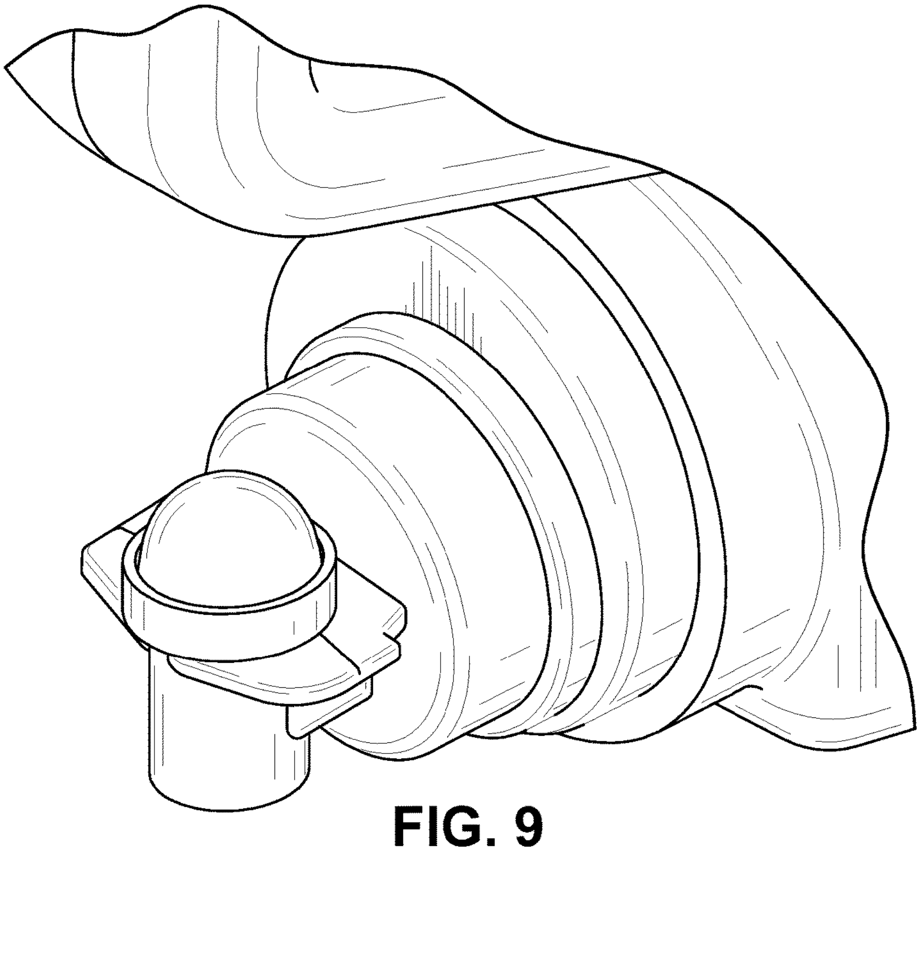

Referring to FIG. 9, the various geometries that make it possible to achieve the objectives required by the market are described below.

Considering the most common neck geometry on the market (33 mm neck, as shown in FIGS. 9 and 27), the useful geometries for anchoring the anti-counterfeiting and child-protection system that is created on the body of the tap 1 are described.

In detail, in FIG. 27, we note the first commitment element 5.1 with anti-counterfeiting and protection function and the second commitment element 5.2 with anti-counterfeiting and protection function, which, in the outdated version marketed and present on the market, work with a surface obtained on the body of the tap (not shown) and determine its correct positioning on the container, while a flexible lip determines its locking in order to avoid easily unscrewing the old tap on the market.

The problem is that this first flexible lip is very fragile and allows the removal of the old technology tap without particular problems.

It was therefore decided to maintain this geometry 40, but to duplicate the seal by adding a third engagement element A with anti-counterfeiting and protection function, shaped as a second flexible lip 3.7 (FIG. 9) at 180° from the first, so that it has the possibility of anchoring itself on the external side of the first engagement element 5.1 of FIG. 27, generating a combination of forces which, added together, make it impossible (or in any case particularly difficult without breaking the "tap system") to remove the tap 1 itself from the container 5, thus obtaining the desired anti-counterfeiting and child-protection functions.

The addition of this second geometry makes the application stable and irremovable, unless it is decided to destroy it making it unusable for a second time, and therefore effectively confirming the sought-after anti-counterfeiting feature for the benefit of the end customer.

Furthermore, the conformation of the connection channel 3.10 between the left part of FIG. 7 and the right part of FIG. 7 (but this also applies to the inventive version of the tap 1A useful for the semi-rigid and/or flexible containers shown from FIG. 10 to FIG. 18) has been designed to create the maximum possible delivery flow, remaining in the external shape 3.10 of the tap 1, as shown in FIG. 8.

Figure 19:
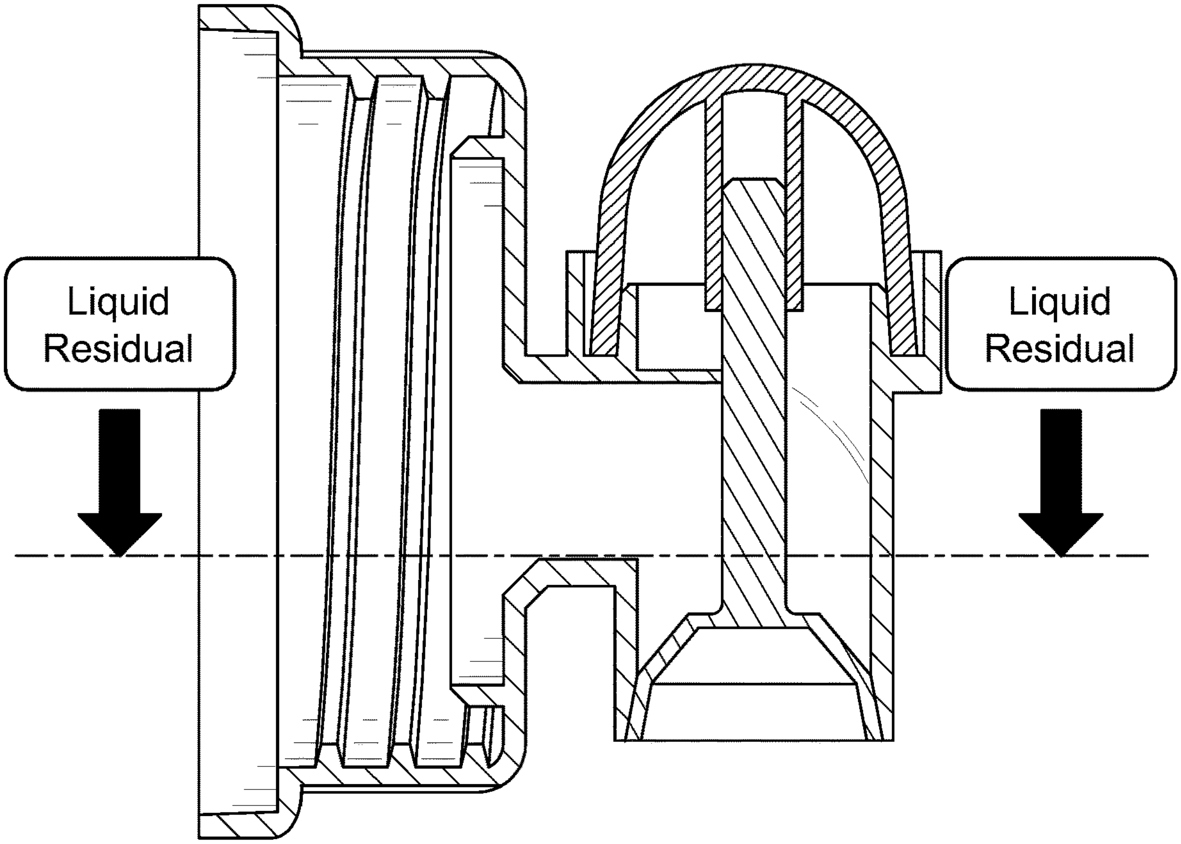
FIG. 19 is a sectional side view in the closed position of the tap currently on the market.
Figure 20:
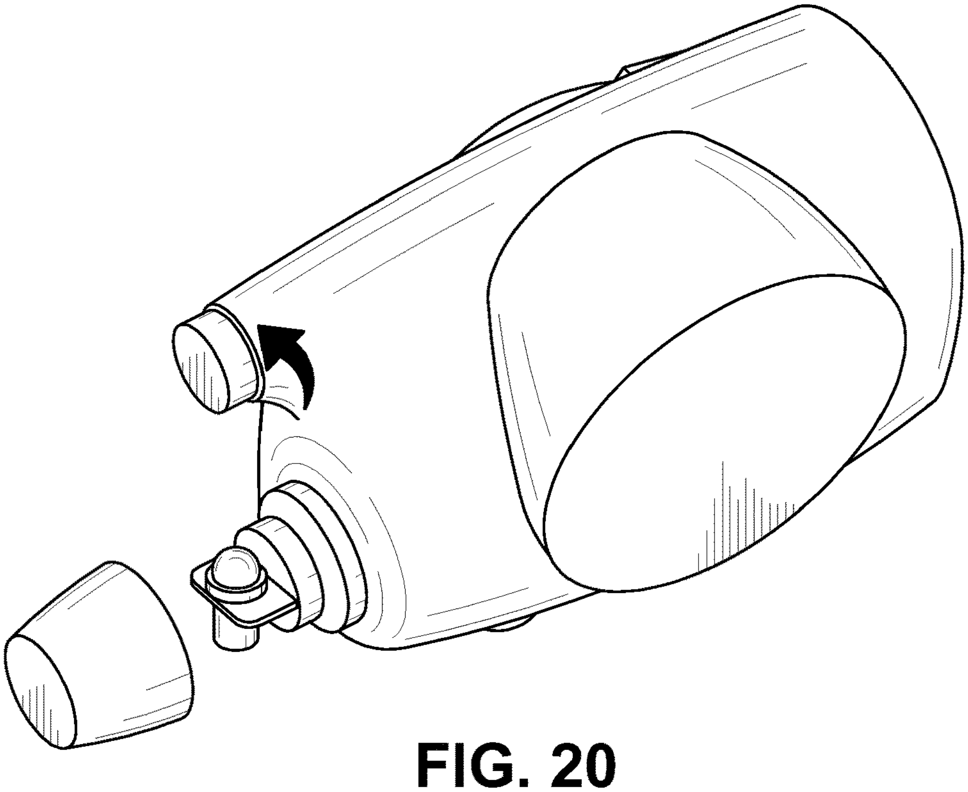
FIG. 20 an isometric view of the tap+rigid container assembly currently on the market.
Figure 21:
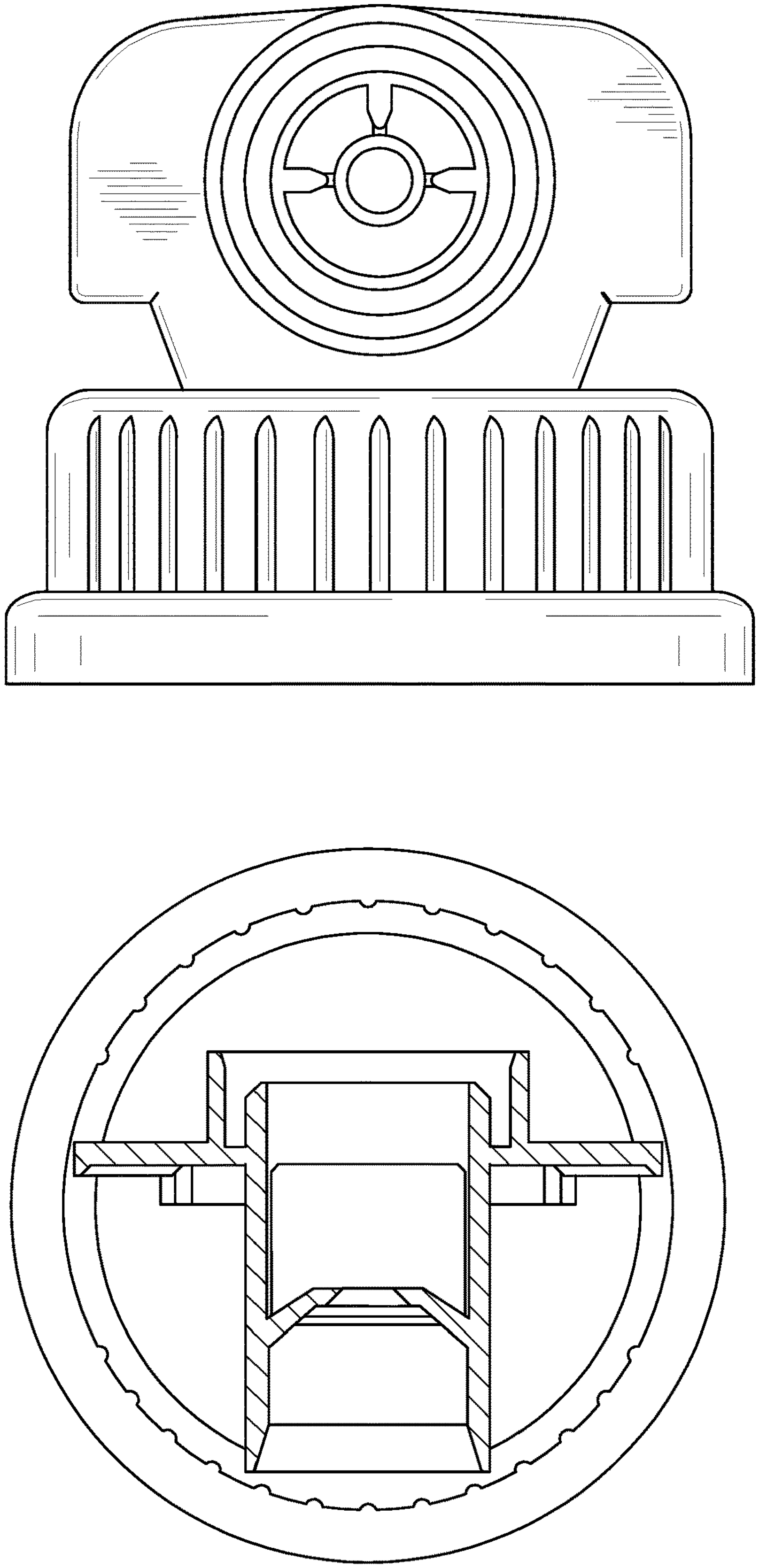
FIG. 21 is an upper sectional front view of the body of the tap currently on the market.

Furthermore, the conformation of this channel 3.10 also allows solving the problem of the outdated technology inherent in the fact that, at the end of the life of the container 5, a lot of liquid remained inside the container 5 itself, as shown in FIG. 19. In this case, as shown in FIG. 7, the outlet profile has been lowered as much as possible, always respecting the external shape of the tap 1 so as not to require any changes on the production lines, so as to bring it as close as possible to the sealing cone 3.6 of FIG. 7. A smaller quantity of residual liquid has been obtained in favor of the end user who will no longer risk throwing away a container 5 with still some fluid inside.

And again, analyzing the right part of FIG. 7 (but this also applies to the inventive version of the tap 1A useful for the semi-rigid and/or flexible containers shown in FIG. 10 to FIG. 18), a cylindrical geometry 3.4 (FIG. 7) is shown connected to the upper part of the tap 1, where the flexible cap 2 is located, in which the four-arm geometries 3.3 are obtained, which serve to create a guide for the stem 4 during the opening phase shown in FIG. 8: otherwise, the stem 4 would tend not to "go down" in axis, diverting the flow of liquid and making it irregular and not vertical. These geometries 3.3 above all help, when producing the piece during the injection phase of the plastic material, to uniform the filling flow by increasing the final quality of the plastic piece.

Furthermore, the fact that, unlike the versions of the tap on the market, the arms are not connected with the lower part of the tap 1 (therefore close to the sealing cone, making it dangerous, as dangerous post-molding deformations could be transmitted which could affect liquid tightness of the application) but with the upper part of the cap, preventing possible post-molding deformations from being transmitted to the geometry of the most important main body, i.e. the front sealing cone 3.5 of FIG. 25, but at the same time also remaining far from the upper sealing geometries 3.1 and 3.2, effectively creating a guide area of the stem 4 placed almost centrally in the main body 3 (but this also applies to the inventive version of the tap 1A useful for semi-rigid and/or flexible containers shown from FIG. 10 to FIG. 18) and not lower, as in the old technology as shown in FIG. 22.

Furthermore, the rear part of the tap 1 of FIG. 7 allows obtaining all the geometries necessary for the connection of the tap 1 on the rigid container 3.12 of FIG. 25 and the liquid sealing geometries on the bottle 3.6 of FIG. 25, but also and especially the orientation geometries 3.9 of FIG. 25 and the geometries 3.7 and 3.8 for finally blocking the tap 1 of FIG.

25 in cooperation with the pre-existing geometries 5.1 and 5.2 on the neck of the container 5 of FIG. 27, as shown in the assembly in FIG. 9.

Therefore, summing up, the dispensing tap 1, 1A of the present invention succeeds in innovating the existing outdated solution, by not modifying the tap 1, 1A externally (and allowing it to be adapted to existing production lines, immediately and without any modification by the customer) and obtaining:

1—better quality of the piece thanks to the new internal geometries;

2—less plastic used to make the components and fewer molding cycles, making the application more "green" and less expensive to produce;

3—an anti-counterfeiting and anti-removal system of the tap 1, 1A thanks to the addition of a flexible flap to the obsolete design currently on the market: this allows complying with the new European and international directives on disposable plastic items (SUP);

4—greater delivery flow thanks to the new shape of the connection channel between the two parts of the tap 1, 1A;

5—new stem guide system constrained to the upper part of the main body and no longer, as in the old technology, to the lower part, which was too close to the sealing cone 3.5 of FIG. 25.

With reference to FIGS. 10 to 18, the inventive tap 1A is noted in its preferred configuration and designed to adapt to semi-rigid and/or flexible containers, preferably BIB.

Also for this version, it was necessary to find a system that would protect the liquid contained inside the rigid containers from counterfeiting.

Figure 28:
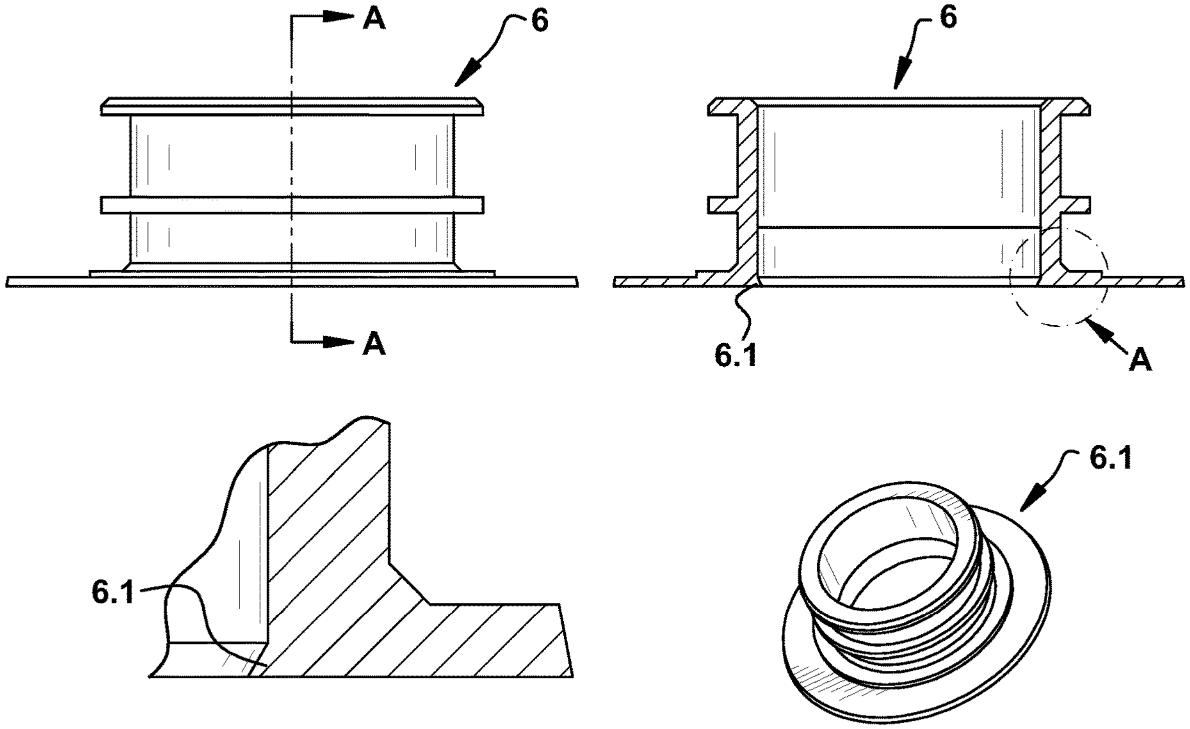
FIG. 28 is a side and front perspective view of the connection spout with flexible or semi-rigid containers, preferably BIB.

The objective of obtaining a dispenser impossible to remove from the housing spout 6 of FIG. 28 has been achieved, creating an undercut both on the body 3A.7 of FIG. 26, and inside the connection nozzle 6.1 of FIG. 28. As highlighted in FIG. 18, it can be seen how the two geometries cooperate with each other, which make the inventive tap 1A immovable from the spout 6 of FIG. 28 once it is completely inserted. It must be remembered that the spout 6 in turn is bound to the semi-rigid and/or flexible container, preferably BIB, and therefore the assembly is a single body, once fully assembled in its final position.

Figure 18:
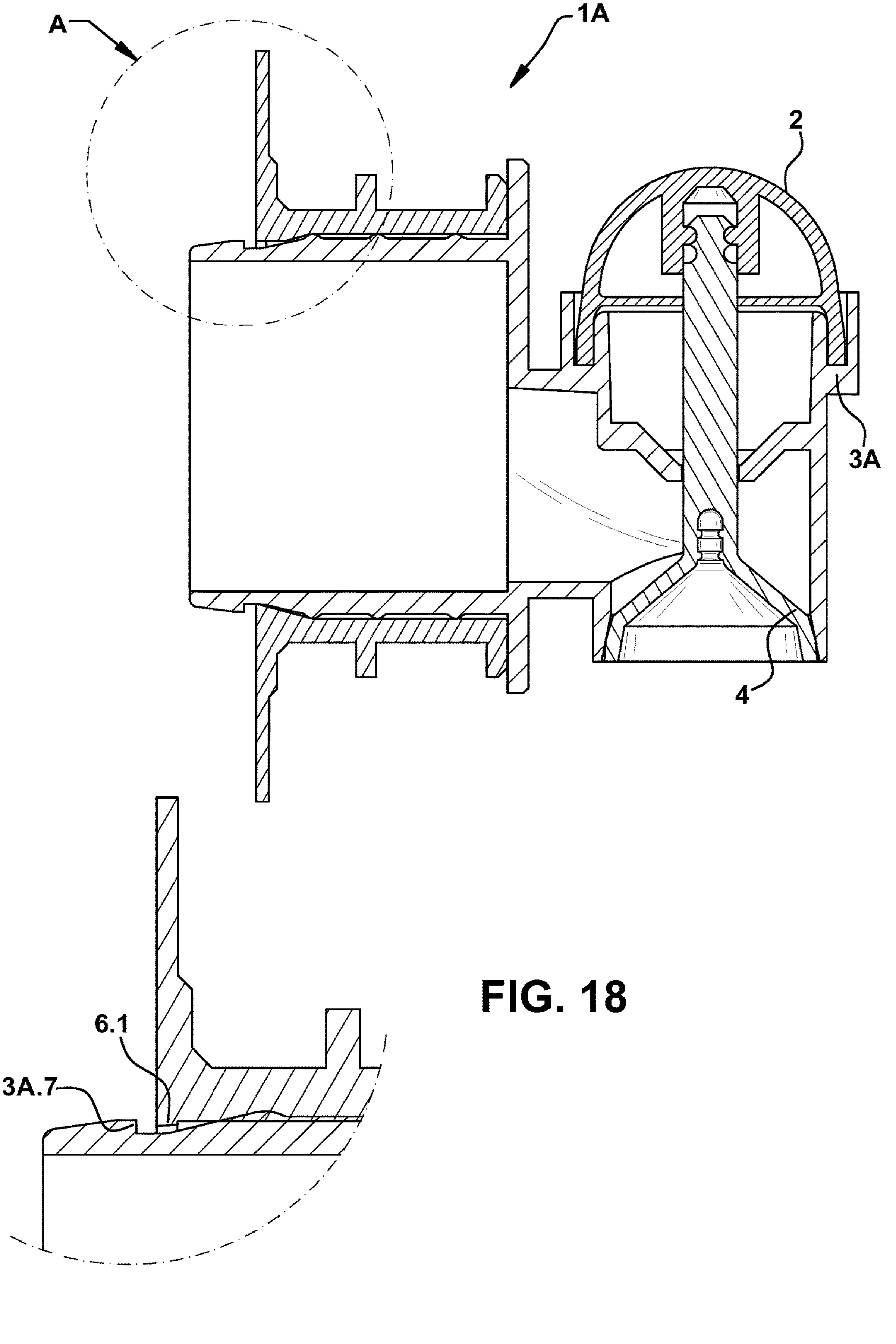
FIG. 18 is a side view in complete section and in detail of an embodiment of the tap according to the present invention, mounted on the connection spout to the flexible container, preferably but not limitedly to the BIB.

Referring to FIG. 18, the various geometries that make it possible to achieve the objectives required by the market will be described.

Furthermore, the shape of the connection channel between the left rear part of FIG. 7 and the right part (delivery end) of FIG. 18 has been designed to create the maximum possible delivery flow rate, remaining with the external shape 3A.8 of the tap 1, 1A, as shown in FIG. 17.

Furthermore, the conformation of this channel also allows solving the problem of obsolete technology inherent in the fact that, at the end of the life of the container, a lot of liquid remained inside the container itself, as shown in FIG. 17. In this case, the outlet profile has been lowered as much as possible, always respecting the external shape of the tap 1A so as not to require any changes on the production lines, so as to bring it as close as possible to the connection cylinder where the seal geometries 3A.6 of FIG. 17 can be found. A smaller quantity of residual liquid has been obtained in favor of the end user, who will no longer risk throwing away a container with still fluid inside.

Furthermore, analyzing the right part of FIG. 17, a cylindrical geometry 3A.4 was created connected to the upper part of the tap 1, 1A, where the flexible cap 2 is placed, in which the four-arm geometries 3A.3 are obtained, which serve to create a guide for the stem 4 during the opening phase shown in FIG. 8: otherwise, the stem 4 tends not to "go down" in axis, diverting the flow of liquid and making it irregular and not vertical, and above all helping, in the realization phase of the piece during the injection phase of the plastic material, to uniform the filling flow by increasing the final quality of the plastic piece.

Furthermore, the fact that, unlike the tap versions on the market, the arms are not connected with the lower part of the tap 1A (therefore close to the sealing cone, making it dangerous, as dangerous post-molding deformations could be transmitted which could affect liquid tightness of the application), but with the upper part of the tap 1A, prevents possible post-molding deformations from being transmitted to the geometry of the most important main body, i.e. the front sealing cone 3A.5 of FIG. 26, at the same time, the arms also remain distant from the upper sealing geometries 3.1 and 3.2, effectively creating a guiding area of the stem 4 placed almost centrally in the main body 3A and not lower, as in the old technology as shown in FIG. 22.

Furthermore, the rear left part of the tap 1A of FIG. 17 allows obtaining all geometries necessary for the connection and the liquid sealing geometries 3A.6 of the cap on the rigid container of FIG. 26 and the final blocking geometries 3A.7 of the tap 1A in cooperation with the pre-existing geometries on the spout 6.1 of FIG. 28.

Therefore, summarizing also for this version useful for connecting the tap 1A to flexible and/or semi-rigid systems, preferably BIB, it was possible to innovate the existing obsolete solution, without modifying the tap 1A externally (and this allows adapting it immediately and without any modification by the customer to the existing production lines) and obtaining:

1—better quality of the piece thanks to the new internal geometries;

2—less plastic used to make the components and fewer molding cycles, making the application more "green" and less expensive to produce;

3—an anti-counterfeiting and anti-removal system of the tap 1, 1A, thanks to the addition of a flexible flap to the obsolete design currently on the market: this allows complying with the new European and International Directives on disposable plastic items (SUP);

4—greater delivery flow, thanks to the new shape of the connection channel between the two parts of the tap 1, 1A;

5—new stem guide system constrained to the upper part of the main body and no longer, as in the old technology, to the lower part, which was too close to the sealing cone 3A.5 of FIG. 26.

The invention claimed is:

1. A tap for dispensing liquids from rigid containers, the tap comprising:

a main containing body equipped on a first side with a liquid dispensing end, and equipped on an opposing second side with an end designed to make a connection with a liquid container;

a cap for activating dispensing operations placed above the liquid dispensing end; and a stem for opening and closing a dispensing of liquids, placed inside the liquid dispensing end and operatively coupled to the cap;

wherein the main containing body includes, on the first side, a cylinder inside which the following are obtained: an upper seat for external sealing of the cap; an internal sealing geometry designed to hermetically mate with an internal geometry of the cap; a cylindrical geometry within which four arms placed at 90° to each other are obtained, designed to connect to a central cylinder and form a guide geometry of the stem; a conical seal geometry designed to couple with a conical geometry of the stem, generating, when the tap is in a closed position, a hermetic seal;

wherein the stem includes: an undercut attachment geometry, designed to cooperate with a complementary geometry obtained on the cap; a relieved elongated part; and a conical geometry on which a ring geometry is obtained which is coupled with the conical seal geometry obtained on the main containing body, generating the hermetic seal of the tap;

wherein the four arms are not connected with a lower part of the tap but with an upper part of the tap preventing post-molding deformations from being transmitted to the conical seal geometry, but at the same time also remaining far from the upper seat and the internal sealing geometry, thereby creating a guide area of the stem placed almost centrally in the main containing body.

2. The tap of claim 1, wherein the main containing body further comprises a connection channel between the first side and the opposing second side, the main containing body containing threaded connection geometries and sealing geometries designed to be operatively coupled with the liquid container, and locking geometries, designed to cooperate together with a stop for correct orientation of the tap when screwed to the liquid container.

3. The tap of claim 1, wherein the cap comprises, an inner cylinder in which geometries configured to stably constrain the stem are obtained, a dome geometry, and an external surface and an internal surface, which are configured to come into contact and operationally interfere with the upper seat and the internal sealing geometry of the main containing body to generate a hermetic seal on the upper part of the tap.

4. The tap of claim 1, wherein the liquid container comprises a first engagement element with anti-counterfeiting and protection function and a second engagement element with anti-counterfeiting and protection function, the first and second engagement elements are configured to cooperate with a surface obtained on the body of the tap to position the tap on the container, while a first flexible lip of the tap is configured to prevent unscrewing the tap from the container;

wherein the tap further comprises second flexible lip positioned 180° from the first flexible lip, designed to anchor on an external side of the first engagement element of the liquid container, generating a combination of forces which added together prevent removal of the tap from the container; and wherein, when the tap is screwed to the container, the first flexible lip, the second flexible lip, and a stop of the tap cooperate with the first engagement element and the second engagement element of the container to correctly orient the tap on the container.

5. A tap for dispensing liquids from flexible containers, the tap comprising:

a main containing body equipped on a first side with a liquid delivery end, and equipped on an opposing second side with an end designed to make a connection with a liquid container;

a cap for activating dispensing operations placed above the liquid delivery end; and a stem for opening and closing a dispensing of liquids, placed inside the liquid delivery end and operatively coupled to the cap;

wherein the main containing body includes, on the first side, a cylinder inside which the following are obtained: an upper seat for external sealing of the cap; an internal sealing geometry designed to hermetically mate with an internal geometry of the cap; a cylindrical geometry within which four arms are obtained, at 90° degrees to each other, which connect to a central cylinder and form the guide geometry of the stem; a conical sealing geometry, designed to couple with the conical geometry of the stem generating, when the tap is in a closed position, a hermetic seal;

wherein the stem includes: an undercut attachment geometry, designed to cooperate with a complementary geometry obtained on the cap; a relieved elongated part; and a conical geometry on which a ring geometry is obtained which is coupled with the conical geometry obtained on the body, generating the hermetic seal of the tap;

wherein the four arms are not connected with a lower part of the tap but with an upper part of the tap, preventing post-molding deformations from being transmitted to the conical sealing geometry, but at the same time also remaining far from the upper seat and the internal sealing geometry, thereby creating a guide area of the stem placed almost centrally in the main containing body.

6. The tap of claim 5, wherein the main containing body further comprises a connection channel between the first side and the opposing second side, the main connecting body further comprising connecting and sealing geometries and locking geometries configured to cooperate with internal geometry and a sharp edge of a connecting nozzle of the liquid container, generating a stable and immovable coupling, and creating an anti-removal and anti-counterfeiting system.

7. The tap of claim 5, wherein the elastic cap comprises, an inner cylinder in which geometries configured to stably constrain the stem are obtained, a dome geometry, and an external surface and an internal surface, which are configured to come into contact and operationally interfere with the upper seat and the internal sealing geometry of the main containing body to generate hermetic seal on the upper part of the tap.

8. The tap of claim 5, wherein the liquid container comprises a first engagement element with anti-counterfeiting and protection function and a second engagement element with anti-counterfeiting and protection function, the first and second engagement elements are configured to cooperate with a surface obtained on the body of the tap to position the tap on the container, while a first flexible lip of the tap is configured to prevent unscrewing the tap from the container;

wherein the tap further comprises second flexible lip positioned 180° from the first flexible lip, designed to anchor on an external side of the first engagement element of the liquid container, generating a combination of forces which added together prevent removal of the tap from the container; and wherein, when the tap is screwed to the container, the first flexible lip, the second flexible lip, and a stop of the tap cooperate with the first engagement element and the second engagement element of the container to correctly orient the tap on the container.

9. The tap of claim 5, wherein the liquid container is a flexible container.

10. The tap of claim 5, wherein the liquid container is a Bag-In-Box container.

* * * * *